US011565946B2

(12) United States Patent
Arndt et al.

(10) Patent No.: US 11,565,946 B2
(45) Date of Patent: Jan. 31, 2023

(54) SYSTEMS AND METHODS FOR TREATING WASTEWATER

(71) Applicant: Ramboll USA, Inc., Arlington, VA (US)

(72) Inventors: Edward Bryan Arndt, Franklin, TN (US); Francis John DeOrio, Auburn, NY (US); Patrick Joseph Campbell, Nashville, TN (US)

(73) Assignee: RAMBOLL USA, INC., Arlington, VA (US)

( * ) Notice: Subject to any disclaimer, the term of this patent is extended or adjusted under 35 U.S.C. 154(b) by 0 days.

(21) Appl. No.: 16/701,725

(22) Filed: Dec. 3, 2019

(65) Prior Publication Data

US 2021/0163313 A1 Jun. 3, 2021

(51) Int. Cl.
*C02F 1/00* (2006.01)
*G06N 3/08* (2006.01)
*C02F 101/34* (2006.01)

(52) U.S. Cl.
CPC .............. *C02F 1/008* (2013.01); *G06N 3/08* (2013.01); *C02F 2101/34* (2013.01); *C02F 2209/006* (2013.01)

(58) Field of Classification Search
None
See application file for complete search history.

(56) References Cited

U.S. PATENT DOCUMENTS

| 5,774,633 | A | * | 6/1998 | Baba | ..................... G05B 13/027 |
| | | | | | 706/25 |
| 9,952,191 | B2 | | 4/2018 | Crisp | |
| 2003/0190673 | A1 | * | 10/2003 | Nikitin | .................... G01N 21/45 |
| | | | | | 435/7.1 |
| 2007/0129914 | A1 | | 6/2007 | Yano et al. | |
| 2007/0195324 | A1 | * | 8/2007 | Adams | ................... G01N 21/53 |
| | | | | | 356/338 |
| 2008/0123934 | A1 | | 5/2008 | Amidi | |
| 2009/0230033 | A1 | | 9/2009 | Bowers, Jr. | |

(Continued)

FOREIGN PATENT DOCUMENTS

| EP | 0943972 A1 | 9/1999 |
| EP | 1832556 A1 | 9/2007 |

(Continued)

OTHER PUBLICATIONS

Jenkins et al., "Manual on the Causes and Control of Activated Sludge Bulking, Foaming, and Other Solids Separation Problems" 3rd Edition, CRC Press, by Taylor & Francis Group, 2017, 42 pages.

(Continued)

*Primary Examiner* — Richard C Gurtowski
(74) *Attorney, Agent, or Firm* — BakerHostetler

(57) ABSTRACT

The present disclosure pertains to a system configured to prepare and use prediction models for controlling contaminants of a liquid. Some embodiments may: sense, via a sensor, a magnified image of a sample of the liquid; identify at least one shape in the image; determine a relative predominance of microscopic life forms within at least a portion of the image; and generate a report indicating any required corrective action based on the identification and the determination.

16 Claims, 15 Drawing Sheets

(56) References Cited

U.S. PATENT DOCUMENTS

| | | | |
|---|---|---|---|
| 2010/0159504 A1* | 6/2010 | Babico | C12Q 1/04 |
| | | | 435/288.7 |
| 2010/0204924 A1 | 8/2010 | Wolfe et al. | |
| 2010/0332149 A1 | 12/2010 | Scholpp | |
| 2011/0125412 A1 | 5/2011 | Salzer et al. | |
| 2011/0261164 A1* | 10/2011 | Olesen | H04N 13/189 |
| | | | 348/46 |
| 2014/0349333 A1* | 11/2014 | Matsumoto | C12Q 1/18 |
| | | | 435/32 |
| 2016/0022568 A1* | 1/2016 | Patel | A61K 8/922 |
| | | | 424/58 |
| 2016/0100135 A1 | 4/2016 | Mikula et al. | |
| 2019/0118121 A1 | 4/2019 | Starcevic et al. | |

FOREIGN PATENT DOCUMENTS

| | | |
|---|---|---|
| EP | 3477011 A1 | 5/2019 |
| WO | 03/093177 A1 | 11/2003 |
| WO | 2004049116 A2 | 6/2004 |
| WO | 2006132289 A1 | 12/2006 |
| WO | 2012069992 A2 | 5/2012 |
| WO | 2013125737 A1 | 8/2013 |
| WO | 2015006821 A1 | 1/2015 |
| WO | 2015088124 A1 | 6/2015 |
| WO | 2018224056 A1 | 12/2018 |
| WO | 2019071384 A1 | 4/2019 |
| WO | 2019139196 A1 | 7/2019 |

OTHER PUBLICATIONS

"Plant Assistant: Getting Your Plant Back to Normal," YouTube video clip uploaded on Oct. 18, 2019 by user Novozymes TV; retrieved from Internet: https://www.youtube.com/watch?v=u2njcqBul0g&feature=youtu.be.

International Patent Application No. PCT/US2020/058504; Int'l Preliminary Report on Patentability; dated Jun. 16, 2022; 9 pages.

* cited by examiner

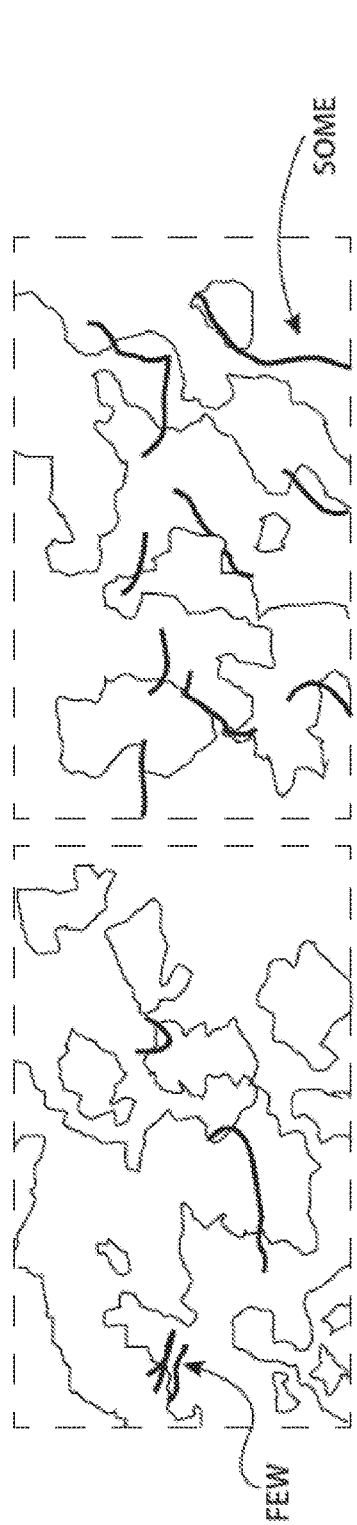
FIG. 13A
FIG. 13B
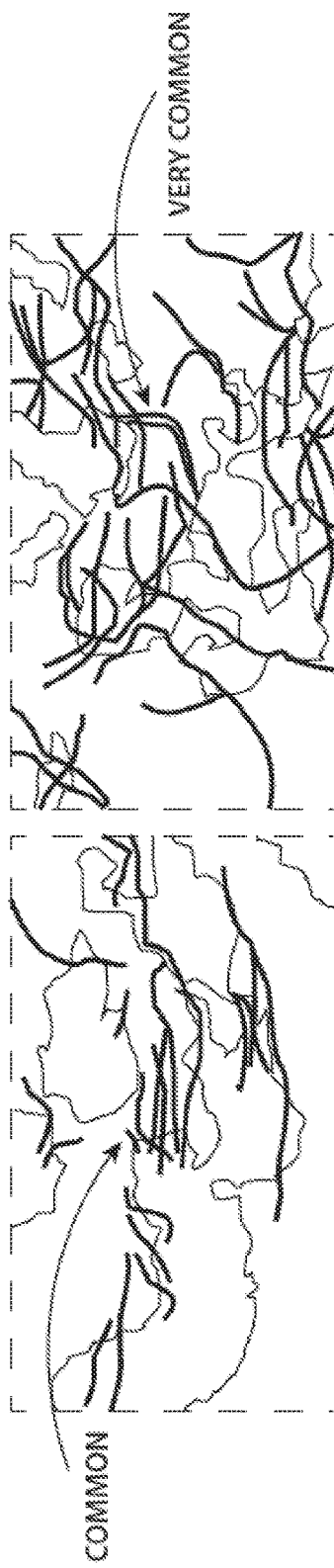
FIG. 13C
FIG. 13D
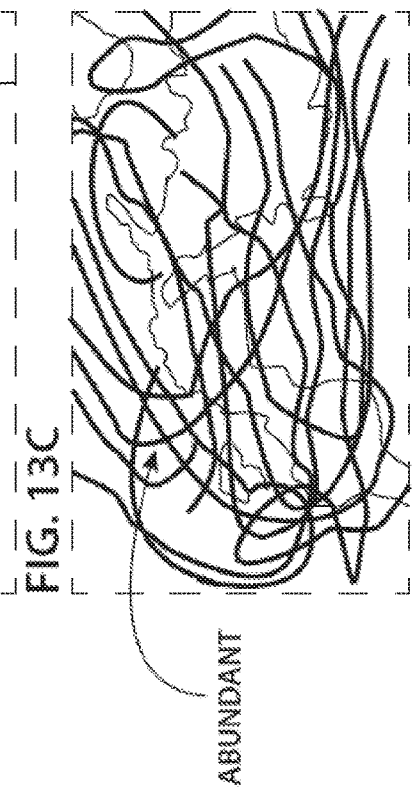
FIG. 13F
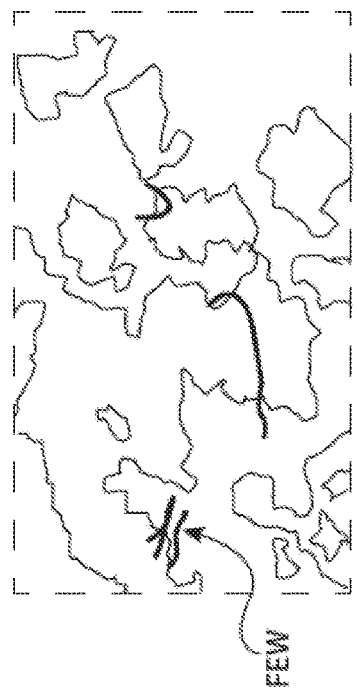
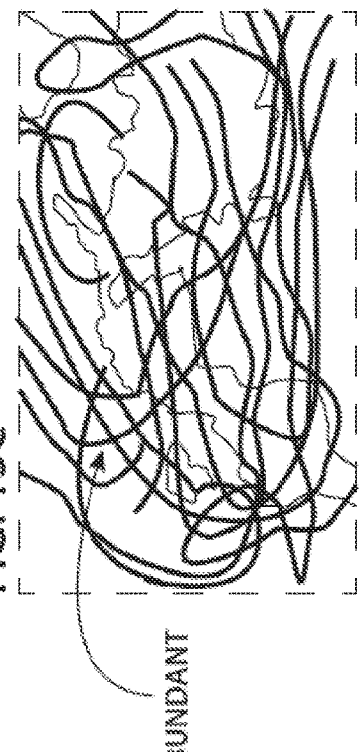
FIG. 13E

SYSTEMS AND METHODS FOR TREATING WASTEWATER

TECHNICAL FIELD

The present disclosure generally relates to systems and methods for identifying and classifying micro-organisms (e.g., filaments and other life forms) from magnified images using trained deep learning models.

BACKGROUND

Wastewater is a mixture of many different components. Some contaminants of wastewater include suspended solids, biodegradable organics, pathogens, nutrients, refractory organics, heavy metals, and dissolved inorganic salts. Accordingly, activated sludge often comprises many different types of micro-organisms (e.g., bacteria, fungi, protozoa, rotifers, etc.), and many interactions occur among the organisms. The organisms may grow on the organic metabolizable food (i.e., substrate) and nutrients available in wastewater in a mixed, aerated environment such that filaments form. The organisms may digest organic matter and form flocs for gravity settling and solid-liquid separation (e.g., via flocculation) in secondary sedimentation as part of the activated sludge process, which treats sewage or industrial wastewaters by removing contaminants.

The presence of some filamentous bacteria in the activated sludge is advantageous by providing a back-bone to which floc-forming bacteria may attach. However, excessive filaments often interfere with settling and may cause problematic bulking and/or foaming. Treatment plants classify magnified views of micro-organisms manually, which is time consuming, costly and prone to human error. Current approaches thus often produce misclassifications, and they are both unreliable and slow. Therefore, there is a need for improved, timely diagnosis.

SUMMARY

Systems and methods are disclosed for classifying portions of images depicting micro-organisms, using artificial neural networks (ANNs). Accordingly, one or more aspects of the present disclosure relate to a method for sensing, via a sensor, an image of a sample of the liquid and for identifying at least one shape in the image. The method may further include determining a frequency or relative abundance of microscopic life forms (e.g., filaments) within at least a portion of the image. Any changes in a predominance of micro-organism frequency and/or atypical population distribution may provide indications on the health of the micro-organism population and thus the performance of the activated sludge process. The method may further include generating a report indicating the probable cause of excessive or deficient filament(s) and a corrective action based on the identification and the determination.

Another aspect of the present disclosure relates to a system configured for micro-organism classification from one or more images. The system comprises one or more hardware processors and other components or media, e.g., upon which machine-readable instructions may be executed according to a herein disclosed process. Implementations of any of the described techniques may include a method, an apparatus, a device, a machine, a system, or instructions stored on computer-readable storage device(s).

BRIEF DESCRIPTION OF THE DRAWINGS

The details of particular implementations are set forth in the accompanying drawings and description below. Other features will be apparent from the following description, including the drawings and claims. The drawings, though, are for the purposes of illustration and description only and are not intended as a definition of the limits of the disclosure.

FIGS. 13A-13F illustrate different detectable relative frequency classes of micro-organism, in accordance with one or more embodiments.

DETAILED DESCRIPTION

The word "may" is used herein in a permissive sense, i.e., having the potential to, rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other.

Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

Known wastewater treatment techniques include micro-organisms being allowed to break down organic compounds of a fluid. Sludge bulking occurs when flocculated solids fail to separate from the bulk liquid. Filamentous bacteria or excessive polysaccharide producing bacteria causes sludge bulking, which is slow to settle or presents enhanced potential to foul membranes. The disclosed approach includes image taking of a sample of a liquid (e.g., wastewater, foam, or another fluid).

Figure 1:
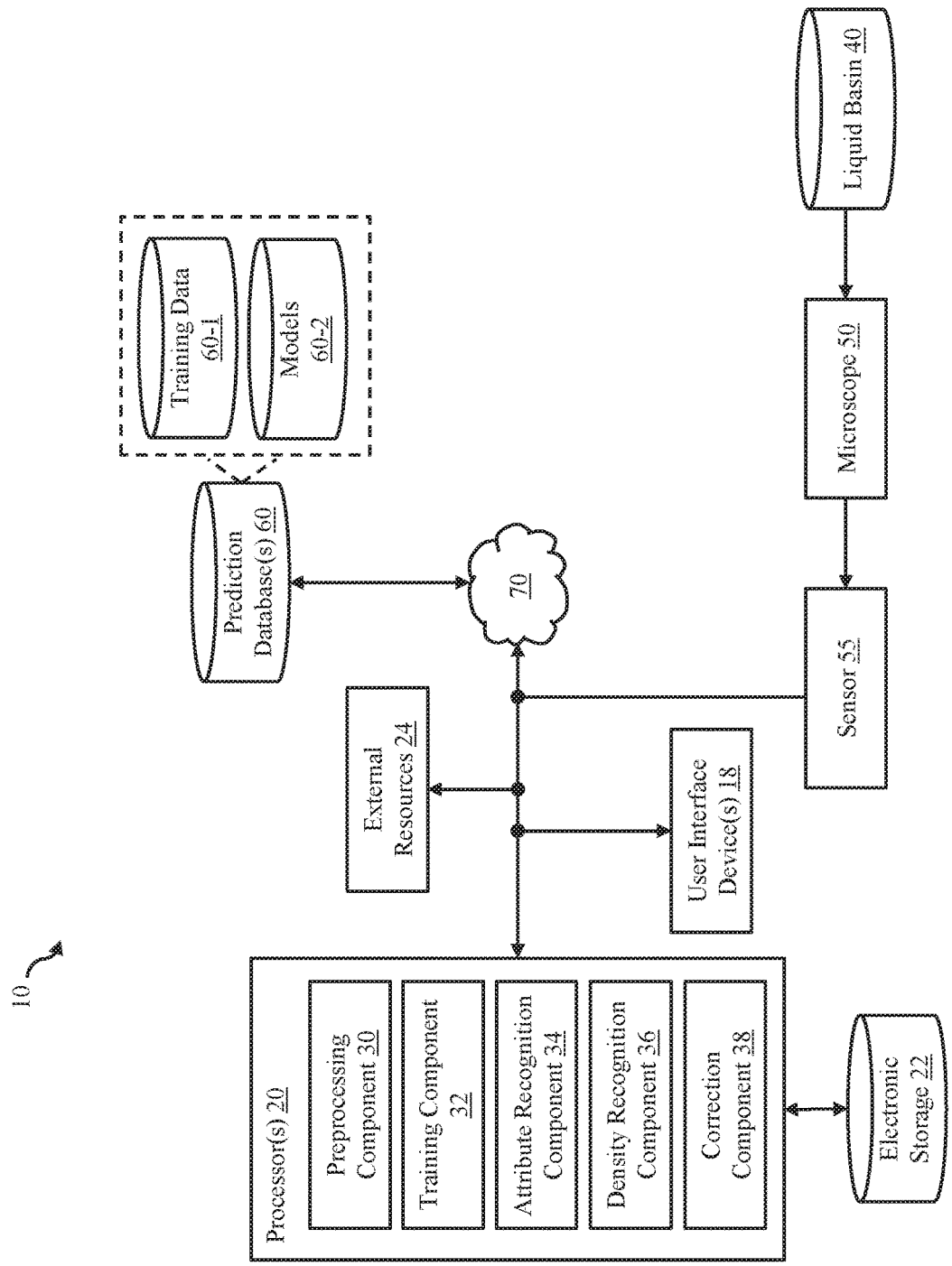
FIG. 1 schematically illustrates a system configured for preparing and using one or more prediction models to detect and classify micro-organism samples, in accordance with one or more embodiments.

Image classification, in the field of computer vision, pertains to how computers can learn aspects of digital imaging. Presently disclosed are ways of classifying portions of magnified images. More particularly, FIG. 1 illustrates system 10 configured to sample wastewater from a treatment plant, sense an image of the sample (e.g., with a mobile camera fitted with a magnifying lens), and identify micro-organisms in the image using a database of possible micro-organisms such that an appropriate flocculant is determined for treating the wastewater. System 10 may further prepare and use one or more prediction models to detect and classify micro-organism types using the magnified images, in accordance with one or more embodiments. For example, thousands, millions, or even hundreds of millions of images may be obtained from one or more sources to determine (e.g., "train") neural networks, these images being training data set 60-1.

An artificial neural network (ANN) may be configured to determine a classification (e.g., type of micro-organisms) based on input image(s). An ANN is a network or circuit of artificial neurons or nodes for solving artificial intelligence (AI) problems. Such artificial networks may be used for predictive modeling.

The prediction models may be and/or include one or more neural networks (e.g., deep neural networks, artificial neural networks, or other neural networks), other machine learning models, or other prediction models. As an example, the neural networks referred to variously herein may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections may be enforcing or inhibitory, in their effect on the activation state of connected neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from input layers to output layers). In some embodiments, back propagation techniques may be utilized to train the neural networks, where forward stimulation is used to reset weights on the "front" neural units. In some embodiments, stimulation and inhibition for neural networks may be more free-flowing, with connections interacting in a more chaotic and complex fashion.

A convolutional neural network (CNN) is a sequence of hidden layers, such as convolutional layers interspersed with activation functions. Typical layers of a CNN are thus a convolutional layer, an activation layer, batch normalization, and a pooling layer. Each output from one of these layers is an input for a next layer in the stack, the next layer being, e.g., another one of the same layer or a different layer. For example, a CNN may have two sequential convolutional layers. In another example, a pooling layer may follow a convolutional layer. When many hidden, convolutional layers are combined, this is called deep stacking and is an instance of deep learning.

Convolutional layers apply a convolution operation to an input to pass a result to the next layer. That is, these layers may operate by convolving a filter matrix with the input image, the filter being otherwise known as a kernel or receptive field. Filter matrices may be based on randomly assigned numbers that get adjusted over a certain number of iterations with the help of a backpropagation technique. Filters may be overlaid as small lenses on parts, portions, or features of the image, and use of such filters lends to the mathematics behind performed matching to break down the image. That is, by moving the filter around to different places in the image, the CNN may find different values for how well that filter matches at that position. For example, the filter may be slid over the image spatially to compute dot products after each slide iteration. From this matrix multiplication, a result is summed onto a feature map.

The area of the filter may be a small amount of pixels (e.g., 5) by another small amount of pixels (e.g., 5). But filters may also have a depth, the depth being a third dimension. This third dimension may be based on each of the pixels having a color (e.g., RGB). For this reason, CNNs are often visualized as three-dimensional (3D) boxes.

In the disclosed CNN, a first convolutional layer may learn edges of an image (e.g., edges of micro-organisms). Similarly, the first convolutional layer may learn bright or dark spots of the image (e.g., light and dark spots in and around flocs). A second convolutional layer may use these learned features to learn shapes or other recognizable features, the second layer often resulting in pattern detection to activate for more complex shapes. And a third or subsequent convolutional layer may heuristically adjust the network structure to recognize an entire object (e.g., recognize a micro-organism type) from within the image.

An exemplary CNN may comprise an M×N×O filter (e.g., 5×5×3 pixels, M, N, and O each being any suitable integer) filter that initially convolves over at least a portion of an image, which may have any suitable pixel dimensions. The disclosed convolution(s) may be performed by overlaying a filter on a spatial location of the image (e.g., the sampled micro-organisms) and multiplying all the corresponding values together at each spatial location as the filter convolves (e.g., slides, correlates, etc.) across the image one pixel (spatial location) at a time. In some embodiments, the filters for one layer may be of different number and size than filters of other layers. Also, the stride does not have to be one spatial location at a time. For example, a CNN may be configured to slide the filter across two or three spatial locations each iteration.

After each convolutional layer, it is conventional to apply a nonlinear (activation) layer immediately afterward, such as a ReLU, Softmax, Sigmoid, tan h, Softmax, and/or Leaky layer. For example, ReLUs may be used to change negative values (e.g., from the filtered images) to zero.

In some embodiments, a batch normalization layer may be used. The batch normalization layer may be used to normalize an input layer by adjusting and scaling the activations. Batch normalization may exist before or after an activation layer. To increase the stability of a neural network, batch normalization normalizes the output of a previous activation layer by subtracting the batch mean and dividing by the batch standard deviation.

In some embodiments, a pooling layer (e.g., maximum pooling, average pooling, etc.) may be used. For example, maximum pooling is a way to shrink the image stack by taking a maximum value in each small collection of an incoming matrix (e.g., the size of a filter). Shrinking is practical for large images (e.g., 9000×9000 pixels). The resulting stack of filtered images from convolutional layer(s) may therefore become a stack of smaller images.

A first phase of the disclosed CNN is feature extraction from images via a combination of one or more of the mentioned layers, and then classification for prediction is performed in a second phase via one or more fully connected layers. The final, output layer of a CNN may thus be a fully connected neural network, which may precisely identify an object in the input image or identify an attribute of the object or of the image as a whole. In addition, to prevent overfitting of the image, some embodiments may use dropout, as a generalization technique. The fully connected layers may connect every neuron in one layer to every neuron in other layer(s). In direct contrast, the neurons of preceding layers in the CNN may only have local connections (e.g., with respect to nearby pixels). Before reaching the fully connected layer, some embodiments may flatten the output from a previous layer. The flattened matrix may then go through a fully connected layer for classifying at least portions of the image.

The fully connected neural network of disclosed embodiments may draw associations between extracted textual features and recognized image elements. That is, in some embodiments, the fully connected layer(s) may be fed image features from the convolutional blocks of different attribute recognition paths (i.e., each path being used for recognizing a different attribute). This layer may then output an image classification prediction.

In some embodiments, system 10 may comprise a CNN that is fully convolutional. In these or other embodiments, system 10 may comprise a fully connected neural network (FCNN). Attribute recognition component 34 and/or density recognition component 36 may apply a CNN on an input image to identify within it a particular shape, micro-organism (e.g., filament and/or other lifeform) abundance, and/or other attribute(s) in order to then determine whether the image comprises a certain micro-organism type.

The structure of the CNN (e.g., number of layers, types of layers, connectivity between layers, and one or more other structural aspects) may be selected, and then the parameters of each layer may be determined by training. Some embodiments may train the CNN by dividing a training data set into a training set and an evaluation set and then by using the training set. Training prediction models with known data improves accuracy and quality of outputs. Once trained by training component 32, a prediction model from database 60-2 of FIG. 1 may generate the various different predictions described herein.

In some embodiments, after manually identifying and labelling data for the training, test, and validation data sets, training component 32 may perform artificial augmentation of the training data set to allow the neural net to learn more precisely and remove certain biases. For example, the average brightness of the training images can be learned as a bias by the network, changing the output when a new image is presented to the network with a different brightness level. Similar biases may stem from orientation, crop, contrast, hue, saturation, and/or other factors. In another example, the artificial data augmentation may include using identified and labelled images and randomly applying one or more functions to those images. These functions may change the aforementioned factors, thus artificially creating a dataset which spans a larger variation of the factors. Since this may be done automatically to each image, some embodiments of training component 32 may apply this technique to an arbitrary subset of training images an arbitrary amount of times and thus create a large increase in training data. Typically, this augmentation is performed on a random number of images, e.g., by randomly applying one or more of the aforementioned functions. This may occur during the training phase of the neural network, and the artificially created images may be discarded immediately after their use.

Statistics on what kinds of functions are applied to certain numbers of images and the resulting changes in performance of the neural network between different training sessions may be recorded (e.g., in electronic storage 22), and the best performing collection may be used for the final product.

Figure 14:
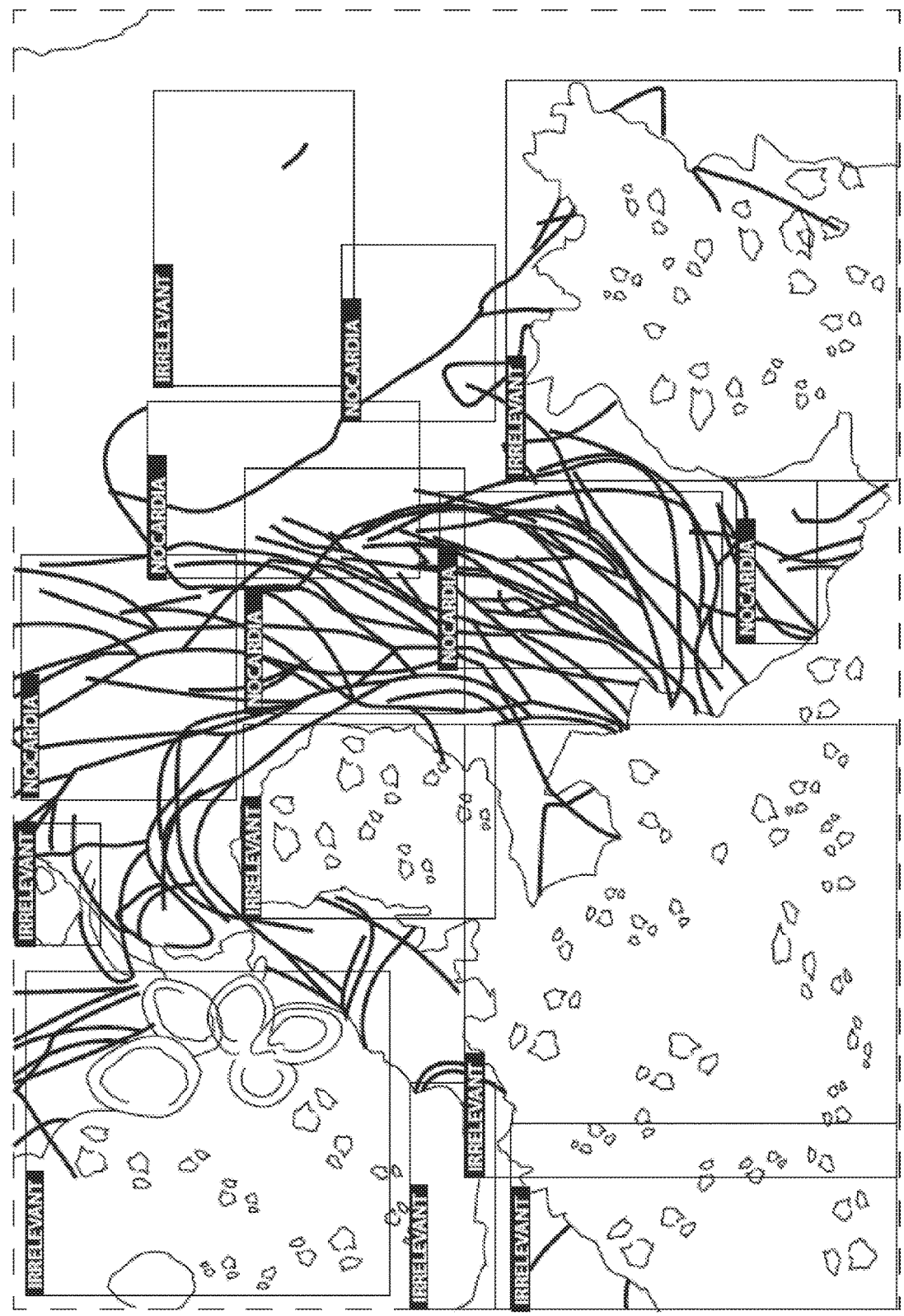
FIG. 14 illustrate a labeling operation for training a machine learning or deep learning classifier, in accordance with one or more embodiments.

The prediction model may analyze its predictions against a reference set of data called the validation set. In some use cases, the reference outputs may be provided as input to the prediction models, which the prediction model may utilize to determine whether its predictions are accurate, to determine the level of accuracy or completeness with respect to the validation set data, or to make other determinations. Such determinations may be utilized by the prediction models to improve the accuracy or completeness of their predictions. In another use case, accuracy or completeness indications with respect to the prediction models' predictions may be provided to the prediction model, which, in turn, may utilize the accuracy or completeness indications to improve the accuracy or completeness of its predictions with respect to input images. For example, a labeled training set may enable model improvement, as depicted in FIG. 14. That is, the training model may use a validation set of data to iterate over model parameters until the point where it arrives at a final set of parameters/weights to use in the model.

In some embodiments, the input image of bacteria or micro-organisms may be one of a series of images. For example, this approach could be applied to a live or on-demand video segment of a fluid flow. System 10 may process a single image or a series of images to determine from among such input a presence of micro-organisms and/or an attribute of the micro-organism. The image may be processed to recognize shapes and/or categories of shapes. Other applications of the disclosed approach may involve real-time evaluations of wastewater.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., a user interface device 18, processor 20, etc.). In some embodiments, electronic storage 22 may be located in a server together with processor 20, in a server that is part of external resources 24, in user interface devices 18, and/or in other locations. Electronic storage 22 may comprise a memory controller and one or more of optically readable storage media (e.g., optical disks, etc.), magnetically readable storage media (e.g., magnetic tape, magnetic hard drive, floppy drive, etc.), electrical charge-based storage media (e.g., RAM, EPROM, EEPROM, etc.), solid-state storage media (e.g., flash drive, etc.), and/or other electronically readable storage media. Electronic storage 22 may store software algorithms, information obtained and/or determined by processor 20, information received via user interface devices 18 and/or other external computing systems, information received from external resources 24, and/or other information that enables system 10 to function as described herein.

External resources 24 may include sources of information (e.g., databases, websites, etc.), external entities participating with system 10, one or more servers outside of system 10, a network, electronic storage, equipment related to Wi-Fi technology, equipment related to Bluetooth® technology, data entry devices, a power supply, a transmit/receive element (e.g., an antenna configured to transmit and/or receive wireless signals), a network interface controller (NIC), a display controller, a graphics processing unit (GPU), and/or other resources. In some implementations, some or all of the functionality attributed herein to external resources 24 may be provided by other components or resources included in system 10. Processor 20, external resources 24, user interface device 18, electronic storage 22, network 70, and/or other components of system 10 may be configured to communicate with each other via wired and/or wireless connections, such as a network (e.g., a local area network (LAN), the Internet, a wide area network (WAN), a radio access network (RAN), a public switched telephone network (PSTN)), cellular technology (e.g., GSM, UMTS, LTE, 5G, etc.), Wi-Fi technology, another wireless communications link (e.g., radio frequency (RF), microwave, infrared (IR), ultraviolet (UV), visible light, cm wave, mm wave, etc.), a base station, and/or other resources.

User interface device(s) 18 of system 10 may be configured to provide an interface between one or more users and system 10. User interface devices 18 are configured to provide information to and/or receive information from the one or more users. User interface devices 18 include a user interface and/or other components. The user interface may be and/or include a graphical user interface configured to present views and/or fields configured to receive entry and/or selection with respect to particular functionality of system 10, and/or provide and/or receive other information. In some embodiments, the user interface of user interface devices 18 may include a plurality of separate interfaces associated with processors 20 and/or other components of system 10. Examples of interface devices suitable for inclusion in user interface device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that user interface devices 18 include a removable storage interface. In this example, information may be loaded into user interface devices 18 from removable storage (e.g., a smart card, a flash drive, a removable disk) that enables users to customize the implementation of user interface devices 18.

In some embodiments, user interface devices 18 are configured to provide a user interface, processing capabilities, databases, and/or electronic storage to system 10. As such, user interface devices 18 may include processors 20, electronic storage 22, external resources 24, and/or other components of system 10. In some embodiments, user interface devices 18 are connected to a network (e.g., the Internet). In some embodiments, user interface devices 18 do not include processor 20, electronic storage 22, external resources 24, and/or other components of system 10, but instead communicate with these components via dedicated lines, a bus, a switch, network, or other communication means. The communication may be wireless or wired. In some embodiments, user interface devices 18 are laptops, desktop computers, smartphones, tablet computers, and/or other user interface devices.

Data and content may be exchanged between the various components of the system 10 through a communication interface and communication paths using any one of a number of communications protocols. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol Version 4 (IPv4) and Internet Protocol Version 6 (IPv6).

In some embodiments, processor(s) 20 may belong to a user device, a consumer electronics device, a mobile phone, a smartphone, a personal data assistant, a digital tablet/pad computer, a wearable device (e.g., watch), a personal computer, a laptop computer, a notebook computer, a work station, a server, a high performance computer (HPC), a vehicle computer, a game or entertainment system, a set-top-box or any other device. As such, processor 20 is configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, user interface devices 18, devices that are part of external resources 24, electronic storage 22, and/or other devices).

As shown in FIG. 1, processor(s) 20 is configured via machine-readable instructions to execute one or more computer program components. The computer program components may comprise one or more of preprocessing component 30, training component 32, attribute recognition component 34, density recognition component 36, correction component 38, and/or other components. Processor 20 may be configured to execute components 30, 32, 34, 36, and/or 38 by: software; hardware; firmware; some combination of software, hardware, and/or firmware; and/or other mechanisms for configuring processing capabilities on processor 20.

It should be appreciated that although components 30, 32, 34, 36, and 38 are illustrated in FIG. 1 as being co-located within a single processing unit, in embodiments in which processor 20 comprises multiple processing units, one or more of components 30, 32, 34, 36, and/or 38 may be located remotely from the other components. For example, in some embodiments, each of processor components 30, 32, 34, 36, and 38 may comprise a separate and distinct set of processors. The description of the functionality provided by the different components 30, 32, 34, 36, and/or 38 described below is for illustrative purposes, and is not intended to be limiting, as any of components 30, 32, 34, 36, and/or 38 may provide more or less functionality than is described. For example, one or more of components 30, 32, 34, 36, and/or 38 may be eliminated, and some or all of its functionality may be provided by other components 30, 32, 34, 36, and/or 38. As another example, processor 20 may be configured to execute one or more additional components that may perform some or all of the functionality attributed below to one of components 30, 32, 34, 36, and/or 38.

Figure 2B:
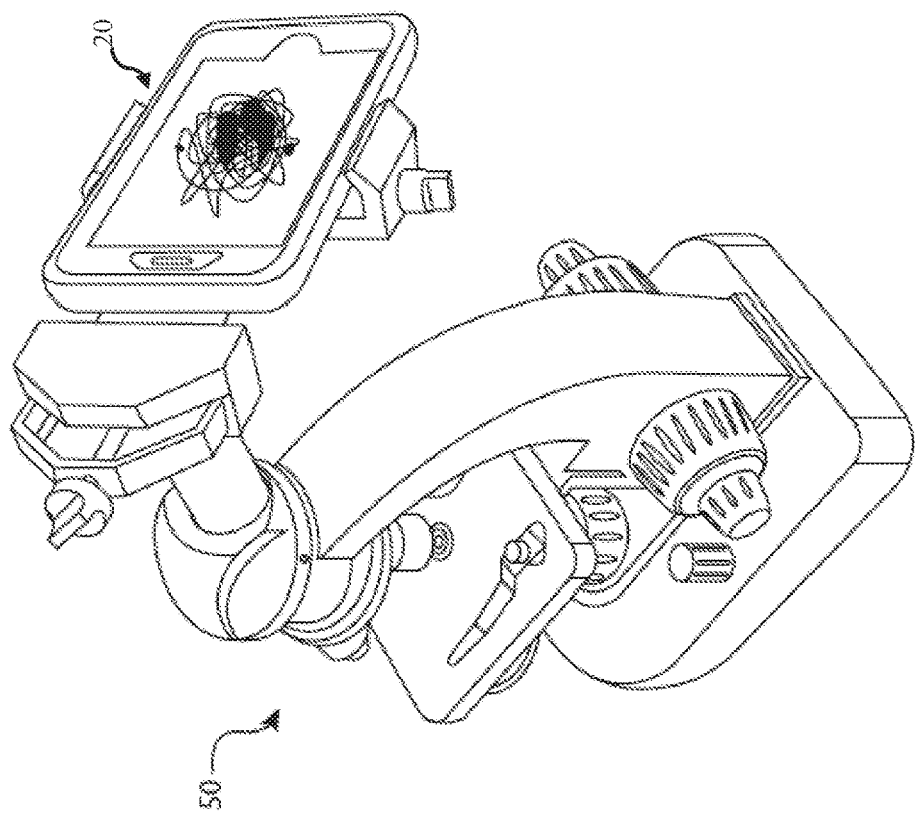
FIG. 2B depicts a microscope able to receive the slide when coupled to a mobile device, in accordance with one or more embodiments.
Figure 2A:
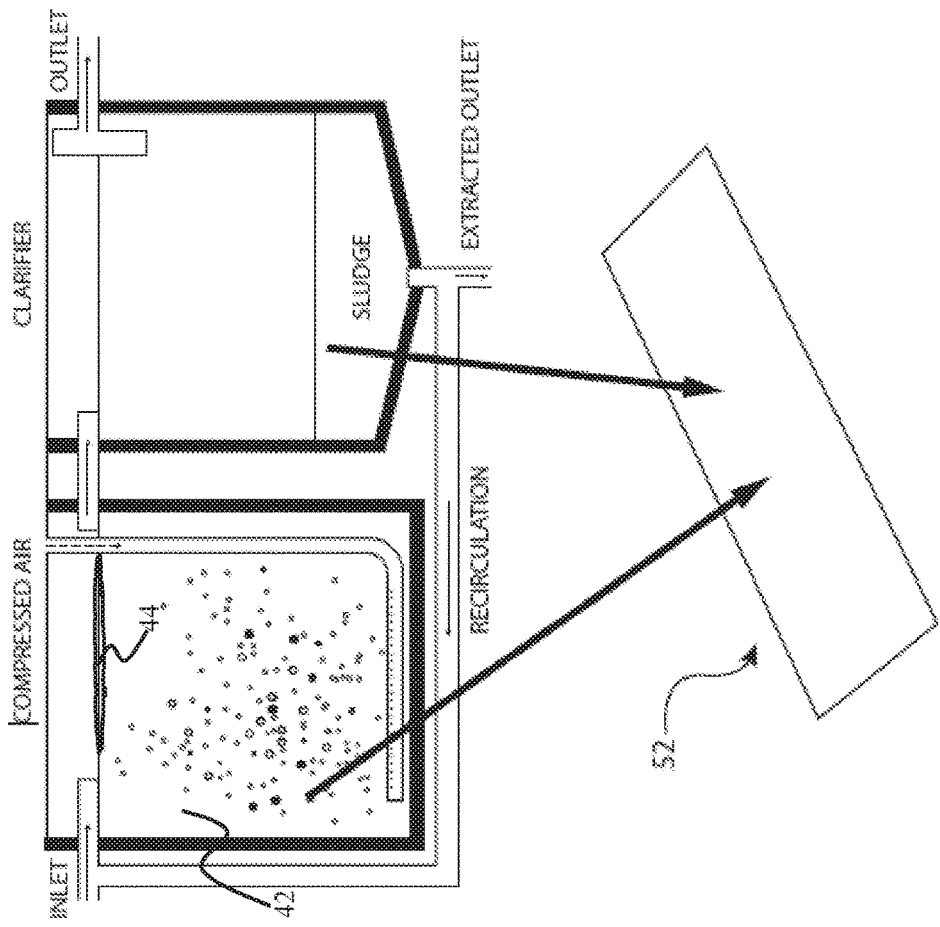
FIG. 2A depicts basins comprising wastewater in different stages from which the sample may be obtained onto a microscope slide, in accordance with one or more embodiments.

Flocs, which may form in an aerated tank or basin (as depicted in FIG. 2A), may be removed in a secondary clarifier by gravity settling. Some of this sludge (e.g., biological solids) may be recycled from the clarifier back to the reactor. The effluent may then be discharged into a natural body of water (e.g., after further treatment in another facility, if necessary). FIG. 2A thus depicts an aeration tank of mixed liquor, into which air (or oxygen) is injected, and a subsequent settling tank or secondary clarifier, wherein the biological flocs are allowed to form and settle for separating the biological sludge from the clear, treated water. A sample may be taken from either tank and spread on slide 52. But this is not intended to be limiting, as the sample or one or more other samples may be taken at any stage of a fluid treatment process.

In some embodiments, a device of system 10 may automatically obtain a sample from liquid basin 40. This may be performed periodically, irregularly, or on-demand by using a wet mount. Using the wet mount, a drop of the sample may be placed or smeared on a clean, dry slide 52 and then covered with a cover slip. As such, attribute recognition component 34 and density recognition component 36 of processor(s) 20 may observe microorganisms live. The sample may also be stained, e.g., via simple staining or differential staining, using a Gram stain, Neisser stain, or India Ink stain.

In some embodiments, liquid basin 40 (e.g., from which a sample is obtained) may be an activated sludge aerated tank, either from bulk liquid 42 or surface foam 44. In other embodiments, liquid basin 40 may be a secondary clarifier. But liquid basin 40, depicted in FIG. 1, is not necessarily limiting, as microscopic analysis of a solid or gas is contemplated.

The sample of slide 52 may consist of a thin film or layer, such as interposed between microscope slide 52 and the covering sheet/slip or as otherwise generated. This layer may be a slice or film of blackwater, wastewater, sewage, foam, or another fluid.

In some embodiments, sensor 55 may be a charge-coupled device (CCD), an active pixel sensor (e.g., CMOS-based, such as 3D-backside illuminated pixel technology with front-side deep-trench isolation (F-DTI) and vertical transfer gate (VTG)), passive infrared sensor, ultraviolet radiation sensor, X-ray microscope, or another image capturing device.

As depicted in FIG. 2B, some embodiments of processor(s) 20 (e.g., of a user device) may obtain one or more output signals from sensor 55, which may be built-in within a common housing (e.g., of the user device depicted in FIG. 2B); it is also contemplated that microscope 50 may be built into the common housing and/or operably coupled to sensor 55. In these or other embodiments, processors 20 may access magnified data via a wired interface, wherein the magnification is performed with a microscope. For example, the wired interface may include Ethernet, universal serial bus (USB), synchronous optical networking (SONET), synchronous digital hierarchy (SDH), point-to-point protocol (PPP), high-level data link control (HDLC), digital subscriber line (DSL), integrated services digital network (ISDN), fiber distributed data interface (FDDI), advanced data communication control procedures (ADCCP), or another wired protocol. In some implementations, microscope 50 may be an electron microscope (e.g., an transmission electron microscope or a scanning electron microscope), optical microscope, phase-contrast microscope, fluorescence microscope, scanning probe microscope, X-ray microscope, or another instrument that magnifies a view. In some embodiments, the applied magnification may be at least 200×, 400×, 1000×, or another suitable magnification value.

In some embodiments, preprocessing component 30 may obtain a sensed image. In some embodiments, preprocessing component 30 may compare a clarity of the image with a quality criterion. And if the clarity (i.e., the ability to clearly see shapes of bacteria) does not satisfy the criterion, the image may be determined to not be in focus and thus another image may be caused to be captured. For capturing a subsequent image having better quality, one or parameters of sensor 55 may be varied. In some embodiments, preprocessing component 30 may sharpen, adjust color, adjust contrast, adjust brightness, or perform other pre-processing to prepare or correct one or more images before further processing is performed.

In some embodiments, training component 32 may implement an algorithm for building and training one or more deep neural networks. A used model may follow this algorithm and already be trained on data. In some embodiments, training component 32 may train a deep learning model of the identified algorithm on training data 60-1 providing even more accuracy, after successful tests with these or other algorithms are performed and after the model is provided a large enough dataset.

Figure 3:
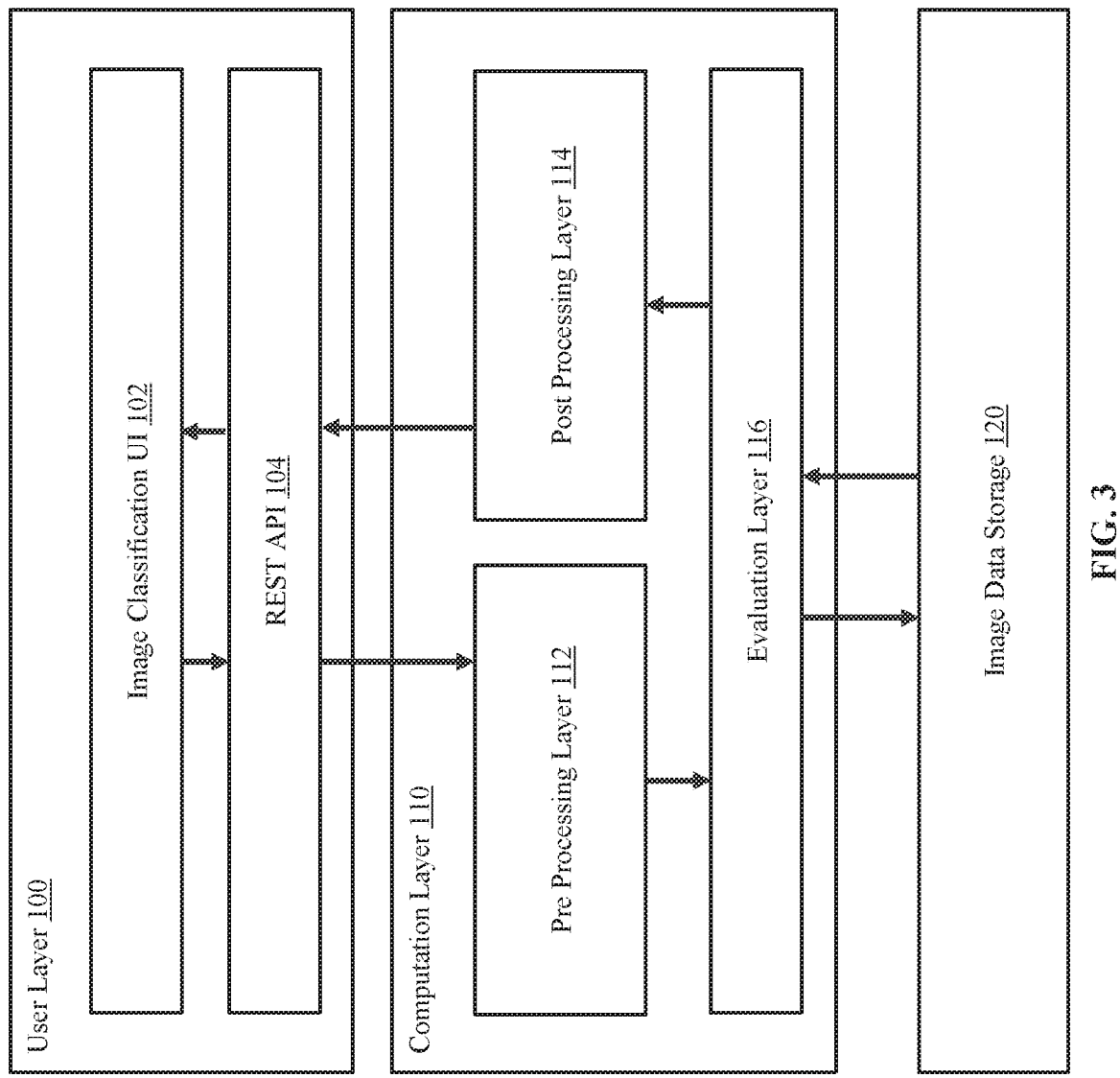
FIG. 3 illustrates a block diagram of a layered architecture for facilitating micro-organism detection and classification, in accordance with one or more embodiments.

FIG. 3 illustrates a block diagram of a layered architecture for facilitating attribute detection and other image classification, in accordance with one or more embodiments. This architecture may comprise user layer 100, computation layer 110, and image data storage 120. User layer 100 may comprise an image classifier user interface (UI) 102 and RESTful application program interface (API) 104. That is, the user layer may be implemented via a web service API that adheres, e.g., to the representational state transfer (REST) architectural constraints, resulting in the RESTful API. User layer 100 may be implemented with such tools as the Django web framework, the Flask micro-web framework, and the Python programming language. As such, at least some of the operations of processor 20 may be developed using any suitable language, such as the Python language, as it facilitates several machine learning tools, solutions, and open source libraries.

Computation layer 110, of FIG. 3, may comprise preprocessing layer 112, post-processing layer 114, and/or evaluation layer 116. System 10's computation layer 110 may be implemented via any cloud service (e.g., Amazon web services (AWS), Microsoft Azure, etc.), Ubuntu operating system, and Python. As is demonstrable with respect to FIG. 3, image data storage 120 may comprise any suitable data storage, such as a mongoDB, which is a cross-platform document-oriented database program, and/or Amazon's simple storage service (S3) of its AWS, which provides object storage through a web service interface. More specifically, image data storage 120 may be implemented via a structured query language (SQL) server and an intelligence tool. System 10 may be implemented via one or more other database management tools, such as the Pivotal Greenplum database.

A model implementing a neural network may be trained using training data obtained by training component 32 from training data 60-1 storage/database, demonstrable with respect to FIG. 1. This training data obtained from prediction database 60 of FIG. 1 may comprise hundreds, thousands, or even many millions of images. For example, a data set may comprise thousands of images of a mix of filament-containing (i.e., relevant) and filament-free (i.e., irrelevant) bacteria. The data set may be split between training, validation, and test sets in any suitable fashion. For example, some embodiments may use about 60% or 80% of the images for training or validation, and the other about 40% or 20% may be used for validation or testing. In another example, training component 32 may randomly split the labelled images, the exact ratio of training versus test data varying throughout. When a satisfactory model is found, training component 32 may train it on 95% of the training data and validate it further on the remaining 5%.

The validation set may be a subset of the training data, which is kept hidden from the model to test accuracy of the model. The test set may be a dataset, which is new to the model to test accuracy of the model. The training data set used to train prediction model 60-2 may leverage, via training component 32, an SQL Server and a Pivotal Greenplum database for data storage and extraction purposes.

In some embodiments, training component 32 is configured to obtain training images from any suitable source (e.g., from proprietary databases or from locally generated storage filled over time during one or more wastewater treatment cycles), via electronic storage 22, external resources 24, and/or user interface device(s) 18. In some embodiments, training component 32 is connected to network 70 (e.g., the Internet). The connection to network 70 may be wireless or wired.

In some embodiments, training component 32 may enable one or more prediction models to be trained. The training of the neural networks may be performed via several iterations. For each training iteration, a classification prediction (e.g., output of a layer) of the neural network(s) may be determined and compared to the corresponding, known classification. For example, an image known to depict certain filament types or other lifeforms may be input, during the training or validation, into the neural network to determine whether the prediction model can properly predict the types' presence. As such, the neural network is configured to receive at least a portion of the training data as an input feature space. Once trained, the model(s) may be stored in database/storage 60-2 of prediction database 60, as shown in FIG. 1, and then used to classify samples of images based on visible attributes.

In some embodiments, preprocessing component 30 of FIG. 1 is configured to preprocess images. In some embodiments, preprocessing component 30 is configured to use the open source computer vision (OpenCV) library of programming functions and the Python image library (PIL). For example, a function from the OpenCV library selected for use as part of the disclosed approach may be directed to real-time computer vision. In some embodiments, a first feature is extracted by one or more functions of the OpenCV library. Preprocessing component 30 may be further configured to preprocess images using the image magic/wand wrapper. After pre-processing, a classifier could operate with respect to the open-source Anaconda Distribution. Anaconda is an open source project that supports many libraries in the Python and R languages, for mathematical programming and statistical modeling.

In some embodiments, attribute recognition component 34 and/or density recognition component 36 are configured to use OpenCV and the PIL. Attribute recognition component 34 and/or density recognition component 36 may be further configured to use the Keras neural network library. That is, at least one of the machine learning models may operate with an activation function from a neural network library, such as Keras, therefore operating with respect to Tensorflow as backend. In some embodiments, system 10 comprises deep neural network powered components (e.g., attribute recognition component 34 and/or density recognition component 36). In some embodiments, these components may be powered additionally or alternatively by one or more other types of neural networks, other types of prediction models, or other types of algorithms.

In some embodiments, the object identification and/or the detection may be performed using at least one machine learning classifier or via deep learning. Some embodiments of attribute recognition component 34 may define attributes or regions, which may be classified (e.g., via a support vector machine (SVM)). For example, some machine-learning implementations may include Viola-Jones object detection framework based on Haar features, scale-invariant feature transform (SIFT), and/or a histogram of oriented gradients (HOG). These or other embodiments of attribute recognition component 34 may perform end-to-end object detection, without specifically defining the attributes, e.g., based on a convolutional neural network (CNN).

In some embodiments, attribute recognition component 34 and/or of density recognition component 36 may cause implementation of deep learning, such as by at least one of a region-based CNN (R-CNN), a fast R-CNN, a faster R-CNN, and/or a mask R-CNN. In these or other embodiments, attribute recognition component 34 and/or of density recognition component 36 may cause implementation of a unified object detection pipeline, such as via you only look once (YOLO), a single-shot multi-box detector (SSD), and/or a recurrent YOLO (ROLO). The deep learning may be performed via one or more ANNs, e.g., where each ANN is used to predict one or more micro-organism attributes, a micro-organism based on the attribute, and a frequency of the micro-organism. Each ANN may be different. For example, a mask R-CNN may be used to detect a trichome location attribute, whereas YOLO may be used to detect presence of cell septa. A mask R-CNN may be a fully convolutional head for predicting masks, which can resize the prediction and generate the mask. These region-based techniques may limit a classifier to the specific region. By contrast, a YOLO technique may access the whole image in predicting boundaries, and it may: (i) detect in real-time which objects are where; (ii) predict bounding boxes; and/or (iii) give a confidence score for each prediction of an object being in the bounding box and of a class of that object by dividing an image into a grid of bounding boxes; each grid cell may be evaluated to predict only one object. As such, YOLO may be used to build a CNN network to predict a tensor, wherein the bounding boxes or regions of interest (ROIs) are selected for each portion of the image. YOLO may predict faster than a mask R-CNN, but the mask R-CNN may make more precise predictions.

In some embodiments, attribute recognition component 34 and/or of density recognition component 36 may implement a combination of machine learning and deep learning techniques for identifying one or more shapes, detecting one or more attributes, and/or determining one or more frequencies. For example, attribute recognition component 34 may determine a bacteria type by predicting detection of the presence of cell septa, septa indentation, sheath, inter-floc bridging, and/or polyhydroxybutyrate (PHB) and/or by predicting detection of a location of a trichome, length of the trichome, shape of the bacteria, and/or another attribute. In another example, density recognition component 36 may determine a health of that determined bacteria type by determining whether its presence is few, some, common, very common, abundant, excessive, or satisfies another criterion (e.g., based on Table 1, below). FIGS. 13A-13F exemplarily depict presence of each of these conditions of straight filaments without branching.

In some embodiments, attribute recognition component 34 is operable to determine that a single image depicts more than one filament type, wherein each type is individually determined. In some embodiments, attribute recognition component 34 may detect presence of one or more indicator organisms, including amoeboid, flagellate, ciliate, rotifer, and/or nematode in the image.

Prediction model 60-2 may include an input layer, one or more other layers, and an output layer. The one or more other layers may comprise a convolutional layer, an activation layer, and/or a pooling layer. The number and type of layers is not intended to be limiting. Artificial neurons may perform calculations using one or more parameters, and the various interconnecting lines of layer represent connections from the output of one neuron to the input of another. That is, the extracted features from multiple independent paths of attribute detectors may be combined. For example, their outputs may be fed as a single input vector to a fully connected neural network to produce a prediction of the bacteria type present in an image.

In some embodiments, attribute recognition component 34 may perform image analysis of bacteria that may cause wastewater problems, a goal being to identify shapes and their relative presence in the field of view from microscope 50. In some embodiments, attribute recognition component 34 may identify shapes of flocs and/or types of filament strands. In these or other embodiments, attribute recognition component 34 may identify a relation among the micro-organisms. Attribute recognition component 34 may use one or more of these identifications to classify and detect each attribute. Or attribute recognition component 34 may implement a vice-versa approach, e.g., where detected attribute(s) are used to identify the micro-organism's shape and/or relationship.

Figure 4:
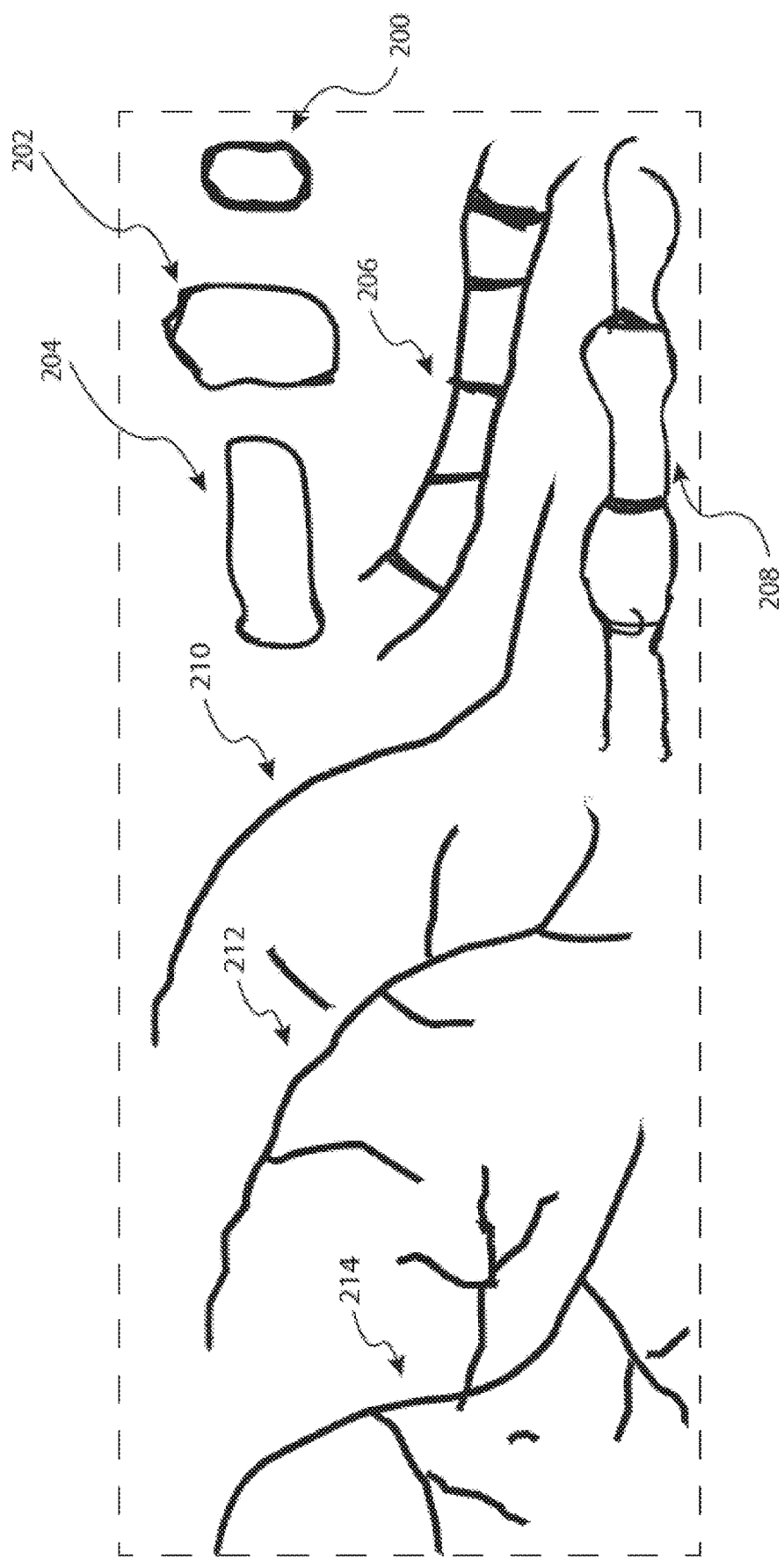
FIGS. 4-10 illustrate different detectable micro-organism structures and attributes indicating biomass health, in accordance with one or more embodiments.
Figure 5A:
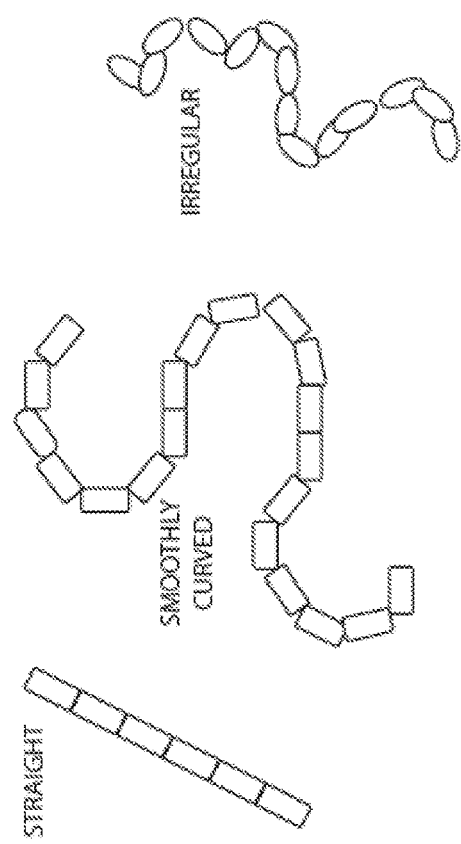

FIG. 4 depicts different types of detectable filament shapes. In some embodiments, attribute recognition component 34 may identify at least one shape of filaments and/or bacterial flocs, including circles or spheres 200, ovals 202, elongated ovals 204, railroad tracks 206, railroad tracks with bulges 208, straight filaments without branching 210, straight filaments with branching 212, and straight filaments with branching on branches 214. Some filaments may thus be smoothly curved, whereas others may be straight or irregularly shaped, as depicted in FIG. 5A. In some embodiments, attribute recognition component 34 may predict presence (or absence) of one of these shapes and/or of one or more other attributes, such as cell septa (see, e.g., FIG. 5B), a sheath, epiphyte (attached growth), true or false branching, the type of motility, size or dimensions of the bacteria (e.g., filaments may range from 0.8 to 5 μm in width and from 5 to >500 μm in length), dispersed cells in the bulk solution, effect of filamentous organisms on floc structure, filament color, location of filament in floc, abundance of filamentous organisms, and/or cross-walls. An amount of these attributes needed to be detected for confident identification of a filament type may be based on a number of filament types that have these attributes. For example, Table 1 shows that Beggiatoa and Thiothrix I have in common various attributes. But attribute recognition component 34 may properly predict one of these two filament types by continuing to detect attributes until a difference is determined (e.g., in the shape's size, where the bacteria under analysis in the sample is detected to be too large to be Thiothrix I). Table 1 contents are from Jenkins, D. et al, Manual on the Causes and Control of Activated Sludge Bulking, Foaming, and Other Solids Separation Problems (2004); IWA Publishing, CRC Press; London UK.

TABLE 1

| MORPHOLOGICAL STAINING CHARACTERISTICS OF FILAMENTOUS BACTERIA OBSERVED IN ACTIVATED SLUDGE | | | | | | | | | | |
|---|---|---|---|---|---|---|---|---|---|---|
| FT | GS | NS | PHB | TL | TLL | CS | I | SH | AG | CL/S |
| Type 1701 | − | − | + | E | 10-150 | + | + | + | + | round rods 0.8 × 1.2 |
| Type 0041 | +/− | +/− | − | IN/E | 100-600 | + | − | + | ++ | squares 1.8 × 2.0 |
| Type 0675 | +/− | +/− | − | IN | 60-160 | + | − | + | ++ | squares <1 |
| Type 021N | − | +/− | + | E | 60->150 | + | + | − | − | barrel 2.0 × 3.0 |
| Type 1851 | − | − | − | E | 100->500 | +/− | − | − | − | rectangle 0.8-1.5 |
| Type 0914 | +/− | +/− | + | E/F | 50-200 | + | − | − | + | square 1 × 1 |
| Beggiatoa | +/− | +/− | + | E | 100->500 | +/− | − | − | − | rectangle 2 × 6 |
| Thiothrix I | +/− | +/− | + | E | 100->500 | +/− | − | − | − | rectangle 2 × 3-5 |
| Thiothrix II | − | − | + | E | 5-200 | + | − | + | − | rectangle 1 × 1.6 |
| M. parvicella | + | + | + | IN | 100-400 | − | − | − | − | variable |
| N. limicola II | +/− | − | + | IN/E | 100-200 | + | + | − | − | oval 1.2 × 1 |
| H. hydrossis | − | − | − | E/F | 20-100 | − | − | + | + | variable |
| Nocardia spp. | + | + | + | IN | 10-20 | +/− | − | − | − | variable |
| S. natans | − | − | + | E | >500 | + | + | + | + | rods 1 × 1.2 |

Accordingly, using such information or measurements as those presented in Table 1, attribute recognition component 34 may identify a filament type (FT) based on a Gram stain (GS), a Neisser stain (NS), presence of polyhydroxy butyrate (PHB), a trichome (TL) location, a trichome length (TLL) in units of presence of cell septa (CS), presence of an indentation (I), presence of a sheath (SH), presence of attached growth (AG), cell length and shape (CL/S), and/or another attribute. In Table 1, the + symbol indicates presence, whereas the − symbol indicates absence. Similarly, the letter E indicates extended growth, IN indicates inter-bridging, and the ++ symbols indicate excessive attached growth.

Figure 10:
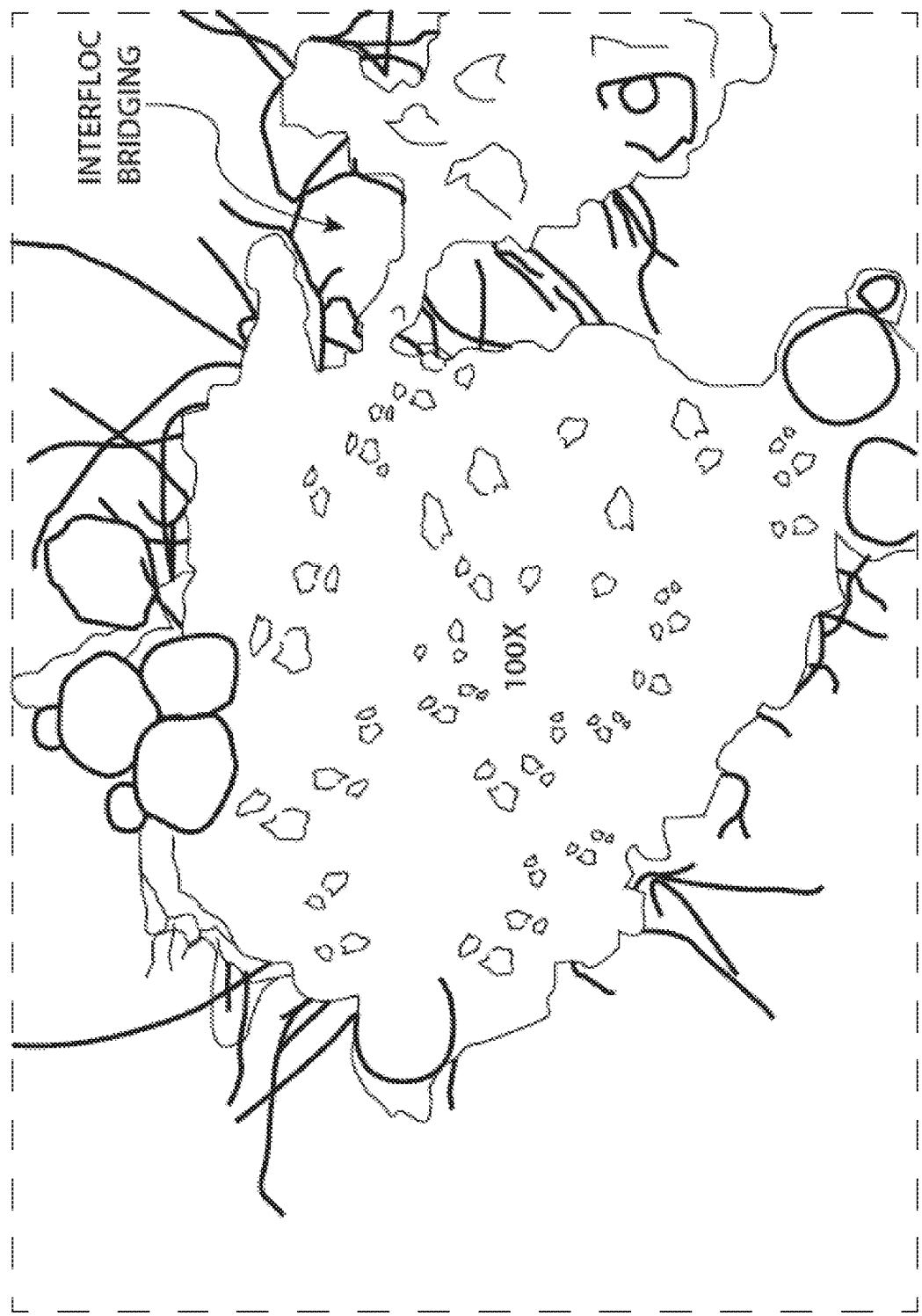

Exemplary filament strands are depicted in FIGS. 6-9 using different magnification levels. FIG. 10 depicts another scenario detectable by attribute recognition component 34. That is, this component may detect presence of a strong floc structure with inter-floc bridging or attached growth.

Figure 5B:
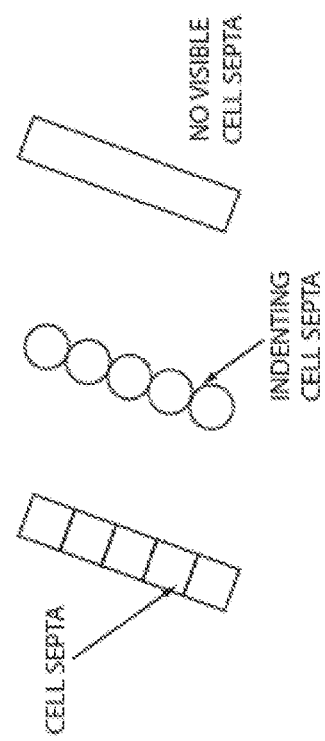
Figure 6:
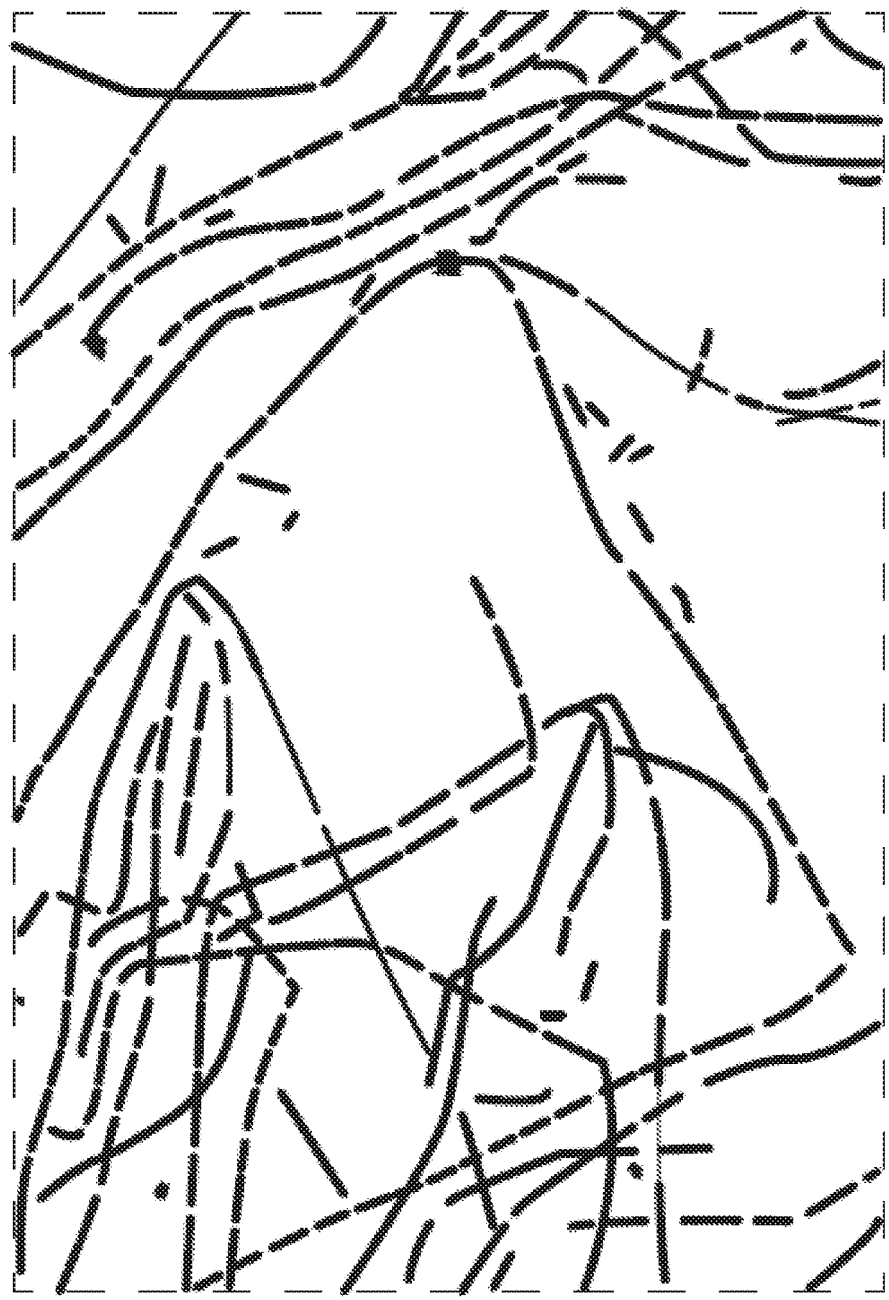
Figure 7:
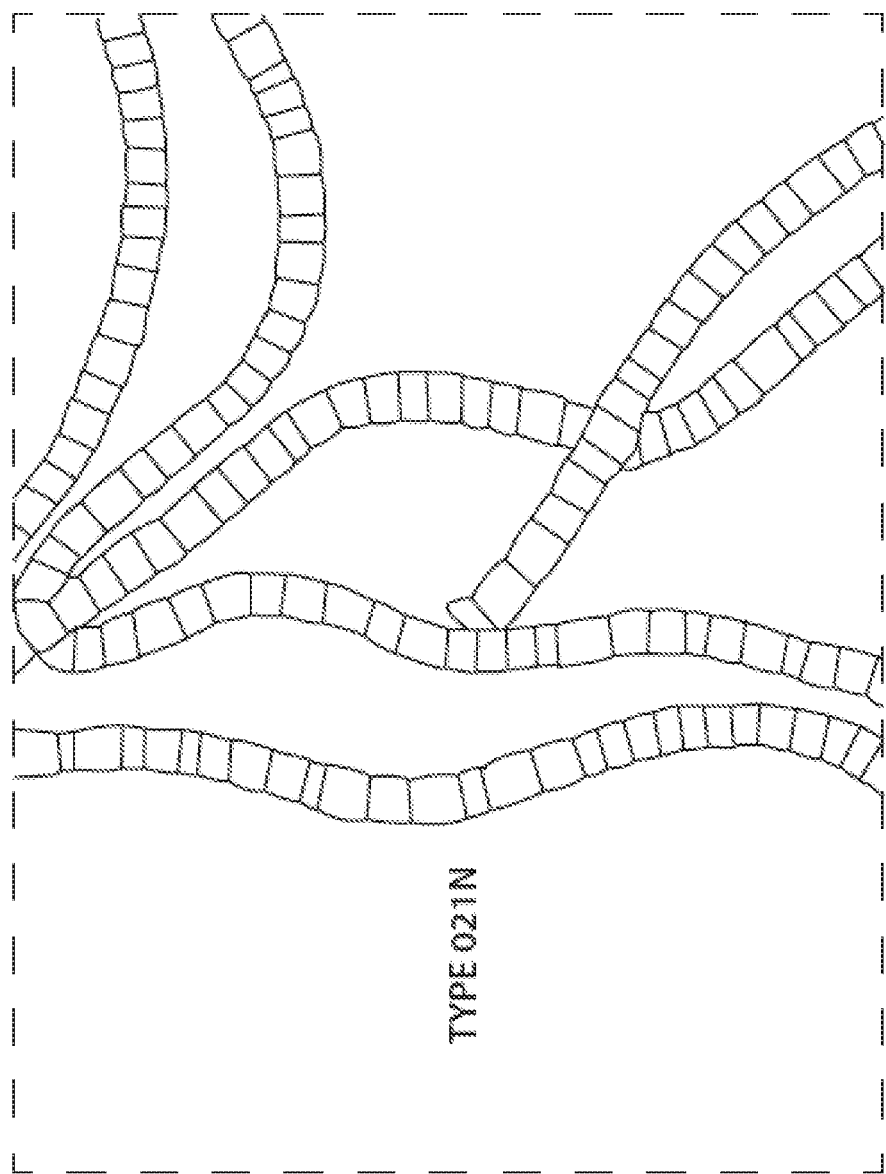
Figure 8:
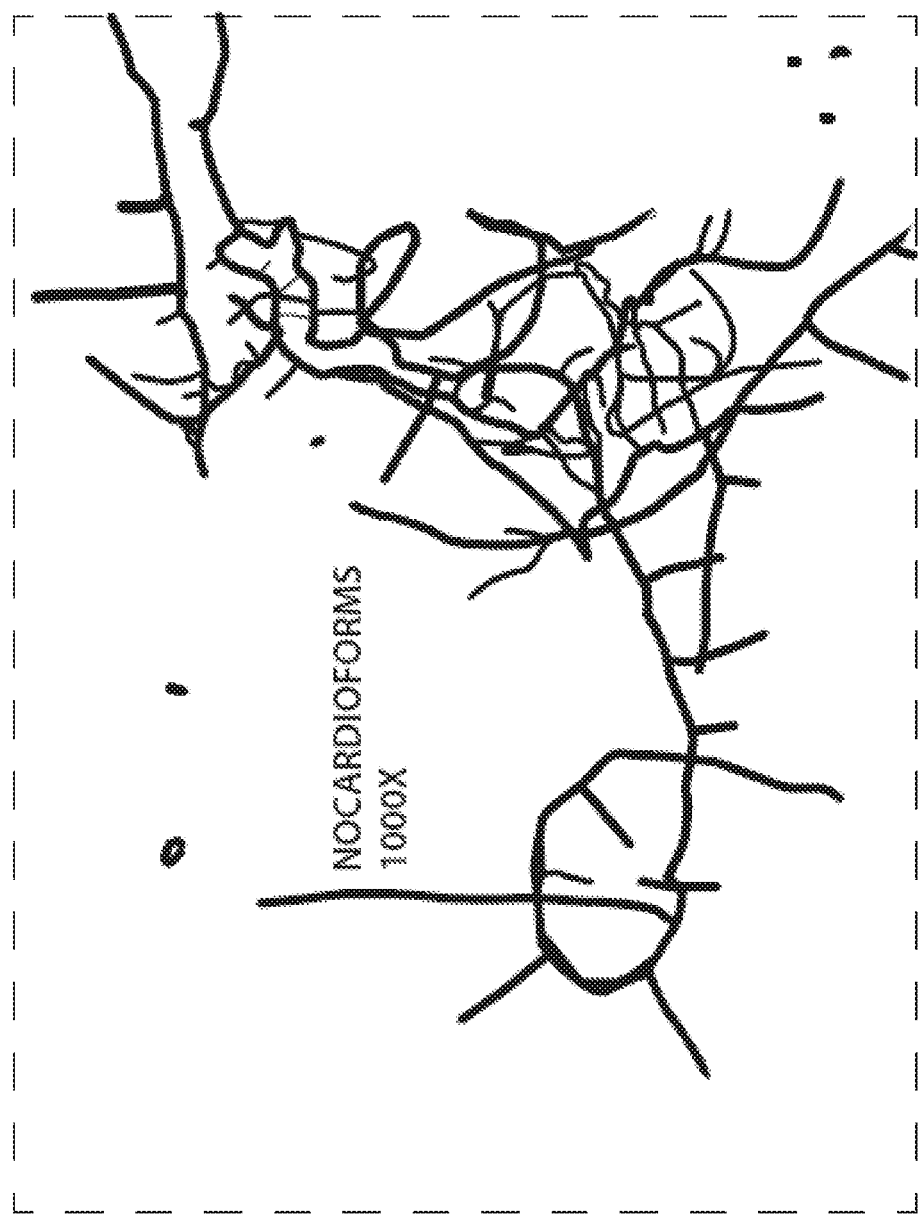
Figure 9:
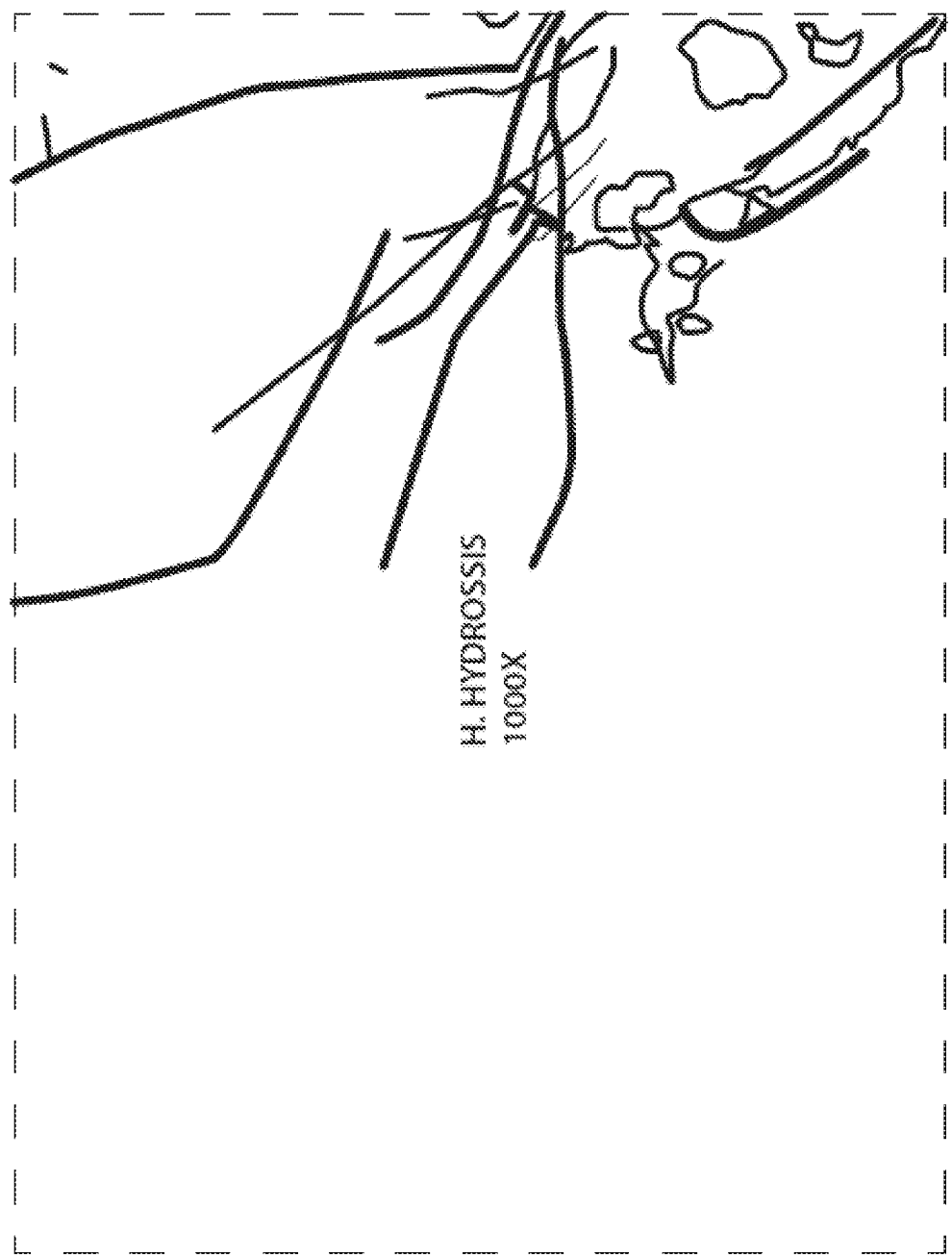

Filaments may be made up of individual cells stacked together (i.e., filaments may be made up of one long cell). Cell septa can be defined as the visible line separating each individual cell. In some implementations, attribute recognition component 34 may thus detect such cell septa and whether they have an indentation, as depicted in FIG. 5B. By detecting one or more (or particular combinations) of the above attributes, attribute recognition component 34 may predict a health of the biomass.

Figure 11:
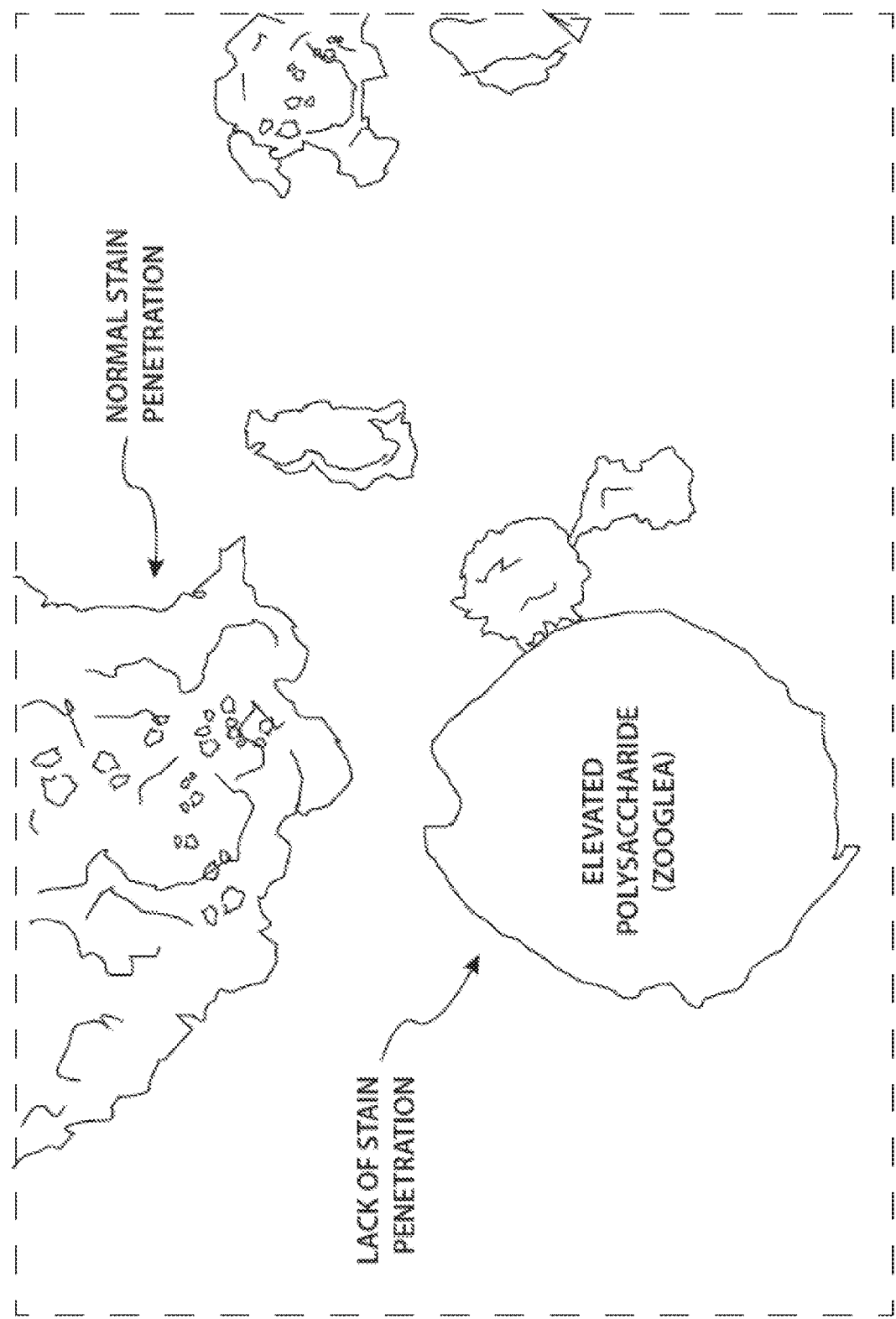
FIGS. 11-12 illustrate another detectable micro-organism characteristic, in accordance with one or more embodiments.
Figure 12:
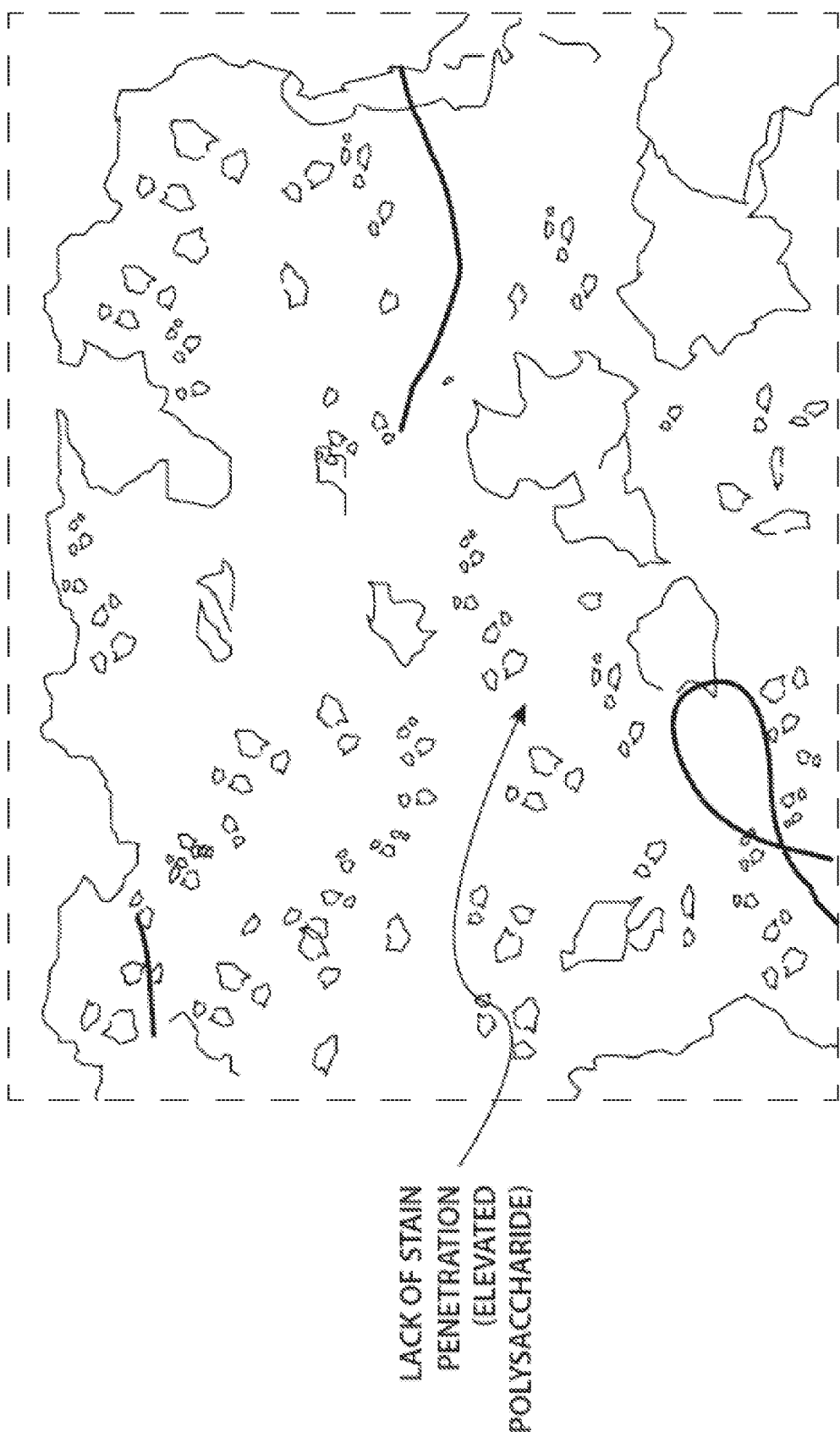

In some embodiments, attribute recognition component 34 may detect presence of glycocalyx or elevated polysaccharide, as shown in FIG. 11. This detection is significant as problematic foam (e.g., which may overflow a tank) may be due to a nutrient deficiency, which causes polysaccharide material to be released from flocs. Secretion of excessive polysaccharides may occur when the bacteria is under stress. That is, the nutrients may be required for metabolic support. When the polysaccharide is secreted, it creates a protective shell around the polysaccharide, which prevents penetration of the stain in the cell (see, e.g., FIG. 12).

Elevated polysaccharide levels are known to cause poor settling (bulking), foaming, and sludge dewatering. Problematic bulking and foaming may thus occur due to a nutrient imbalance, certain operating condition (e.g., low dissolved oxygen (DO)), and certain filamentous bacteria. For example, operating conditions may change, favoring growth of some filaments over floc-formers such that they dominate. In some embodiments, attribute recognition component 34 and/or of density recognition component 36 may determine which filaments are causing problems in the treatment plant (e.g., by categorizing the filament as either a bulker or a foamer) for bringing conditions back into normal operating conditions.

In some embodiments, attribute recognition component 34 may perform one or more microscopic evaluations to identify filamentous bacteria. By contrast, known approaches are one or more orders of magnitude more time consuming. The disclosed approach may thus cause real-world improvement by at least preventing failures in wastewater treatment plant performance. For example, corrective action may be caused from an output of attribute recognition component 34 and/or of density recognition component 36, which characterizes a sample (e.g., by the herein described determination(s), detection(s), and/or identification(s)). This characterization and respective corrective action may be dynamically determined, for immediate performance, i.e., in real-time or near real-time (e.g., within 6-60 minutes). This improves any known approaches that unacceptably take much longer (e.g., 4-5 days), by eliminating need of human involvement (e.g., without having to transport a sample and/or remove the sample from among the liquid).

In some implementations, human involvement, which is prone to error and delay, may be reduced in the disclosed sample-spreading (e.g., onto microscope slide 52), micro-organism type identification, and/or corrective determination. The disclosed approach may further improve by removing sample transportation steps (e.g., from a plant to a lab, which may require air travel). Speed improvement using one or more herein described techniques may cause a quality level otherwise unachievable manually. That is, serious problems can occur abruptly (e.g., in a matter of hours) in a biological system; being forced to wait too long (e.g., 4-5 days) to get a diagnosis of the problem could negatively affect the treatment process. Accordingly, in some embodiments, attribute recognition component 34 and/or of density recognition component 36 may immediately determine a diagnosis for corrective action, when a determined confidence level satisfies a criterion. For example, attribute recognition component 34 may identify a micro-organism, density recognition component 36 may determine a frequency, and correction component 38 may wirelessly transmit a report with any recommendation(s) for implementing a corrective action, i.e., without otherwise waiting for service performance by one or more people.

In some embodiments, attribute recognition component 34 may identify stalked ciliates, rotifers, and amoebas in addition to or instead of identifying filamentous bacteria. Using these identifications, correction component 38 may determine a status of wastewater 40 and/or predict a future status of the wastewater. In some embodiments, attribute recognition component 34 may identify filaments that dominate in the system for better understanding the underlying conditions. Correction component 38 may leverage this improved understanding so that proper corrective change is made.

In some embodiments, correction component 38 may determine a probable cause based on a type of indicator organism identified. For example, correction component 38 may determine a probable cause of low DO concentration, e.g., based on the detected presence of *S. natans*, type 1701, type 1863, and/or *H. hydrossis*. Similarly, correction component 38 may determine a probable cause of a low food to microorganism (F/M) ratio, e.g., based on the detected presence of type 0041, type 0675, type 1851, and/or type 0803. Similarly, correction component 38 may determine a probable cause of high levels of low molecular weight (LMW) organic acids, e.g., based on the detected presence of Thiothrix I, Thiothrix II, *N. limicola* I, *N. limicola* II, *N. limicola* III, type 021N, type 0914, type 0411, type 0961, type 0581, and/or type 0092. Similarly, correction component 38 may determine a probable cause of hydrogen sulfide, e.g., based on the detected presence of Thiothrix I, Thiothrix II, Beggiaotoa species, type 021N, and/or type 0914. Similarly, correction component 38 may determine a probable cause of nitrogen deficiency, e.g., based on the detected presence of Thiothrix I and/or Thiothrix II. Similarly, correction component 38 may determine a probable cause of phosphorus deficiency, e.g., based on the detected presence of *N. limicola*, *H. hydrossis*, and/or *S. natans*. Similarly, correction component 38 may determine a probable cause of low pH, e.g., based on the detected presence of fungi. In some embodiments, correction component 38 may determine a probable cause (e.g., sludge age) by selecting from among these and/or other identified condition types.

In some embodiments, density recognition component 36 may determine a relative frequency of bacteria. For example, by using polygonal segmentation, density recognition component 36 may count each single cell directly. In these or other embodiments, density recognition component 36 may determine such a frequency without counting exact numbers of bacteria by instead determining broad categories (e.g., rare, abundant, extremely abundant). The latter embodiments may accomplish this by considering a portion of an area covered with bacteria versus a complete area of the detected enclosure. FIG. 14 exemplary depicts rectangular enclosures wherein a type of bacteria (e.g., *Nocardia*)

is identified and wherein nothing of relevance is identified in other portions. Density recognition component 36 may take other measurements within the image as references for scale.

In some embodiments, density recognition component 36 may determine a frequency of bacteria. In these or other embodiment, density recognition component 36 may determine a frequency of bacteria flocs. Density recognition component 36 may also determine a good, healthy floc (e.g., that contains floc-forming bacteria and filamentous bacteria grown in balance), a filamentous floc (e.g., that causes inter-floc bridging or a diffused floc), a viscous floc (e.g., that contains excessive amounts of exocellular slime that is produced by the floc-forming bacteria during periods of nutrient deficiency), a floating floc (e.g., produced through the release of non-degradable surfactants and lipids by *Nocardia*), a gas-entrained floc (e.g., which results from the entrapment of insoluble nitrogen gas released during denitrification), a curdled floc (e.g., which is formed by the interaction of floc-forming bacteria and relatively high concentrations of toxic substances, such as multivalent cations), a pin-point floc (e.g., in which filamentous bacteria are absent), and a dispersed floc (e.g., which contains small clusters of bacterial cells but lacking true floc particles).

In some embodiments, the determined frequency may be used to determine an extent of a problem. For example, if the frequency is below a threshold, then this may indicate that those filaments were inadvertently killed. This killing is a problem, as filamentous organisms are good scavengers; they consume substrates more efficiently than floc-forming bacteria. Flocs with a strong backbone may desirably have a relatively small abundance of filamentous bacteria. However, if the frequency is above a threshold, then this may indicate a condition in the wastewater plant that is not ideal. Accordingly, parameters of the plant to be adjusted may be determined based on which filament is present and at which level of density.

In some embodiments, density recognition component 36 may determine a relative frequency of micro-organisms in at least a portion of a sample of mixed liquor, which may indicate an operating condition. Some embodiments may thus adjust a biomass by adjusting underlying conditions that support the filament(s). For example, when type 1851 (low F/M) is identified a first corrective action may be determined, and when type 1701 (low DO) is identified a second corrective action may be determined. The term relative frequency may indicate a count, amount, abundance, dominance, depth, and/or density, these terms being used herein interchangeably. FIG. 14 depicts bounding boxes each of which, for non-irrelevant contents, may be analyzed. That is, some embodiments of density recognition component 36 may determine a filament's frequency relative to the respective box. In other embodiments, the frequency may be relative to the entire image of the sample of slide 52.

As depicted in FIG. 14, some embodiments of training component 32 (or performed manually) may label the bacteria by detecting one or more (e.g., rectangular) bounding boxes that cover the parts or groups of bacteria essential for identifying the bacteria. In these or other embodiments, training component 32 may more precisely perform labeling via polygonal segmentation, e.g., where a given bacterium is enclosed within a polygonal shape that fits as close as possible.

In some embodiments, training component may optimize determinations of health of a biomass based on the one or more evaluations implemented by attribute recognition component 34 and/or of density recognition component 36. For example, correction component 38 may determine one or more corrective actions. In some embodiments, correction component 38 may report the corrective action such that the treatment plant operations could be adjusted to control the growth rate of the identified type of filament. Once a filamentous bulking event has been identified, it may be possible to control the filaments temporarily by using such methods as chlorination or the addition of hydrogen peroxide. This can be accomplished with minimal damage to the floc in a system if controlled dosages are applied. By reducing or removing the causative agent, the filament's ability to grow may be impaired.

Some embodiments of system 10 may cause a ratio of biomass to food supplied in the wastewater to be kept in balance. That is, this ratio may be adjusted by adjusting the food fed to the microorganisms held under aeration to better control a number of microorganisms. Based on a report from correction component 38, clarifying agents may be recommended to be used to remove suspended solids from liquids by inducing chemical flocculation, which causes the solids to begin to aggregate, form flakes, collide, and/or agglomerate. The resulting flocs may either precipitate to the bottom or float to the surface of the liquid, which facilitates easier removal or collection. As such, the formation and the properties of flocs may affect the performance of activated sludge systems.

In some embodiments, correction component 38 may determine a corrective action based on a probable cause related to a relative frequency of a type of filamentous organism determined, via density recognition component 36, to be present in the sample. This presence may be determined based on one or more herein described identifications and detections (e.g., performed using outputs of attribute recognition component 34 and density recognition component 36).

In some embodiments, correction component 38 may report the determined corrective action. In some implementations, the reporting may comprise a transmission in real-time such that at least one device or instrument responsively performs the determined action. In other implementations, the reporting may comprise an external transmission in real-time such that an operator causes performance of the determined action. The determined action may include one or more of adjusting a nutrient, a sludge volume index (SVI) and setting rate, a temperature, a biochemical oxygen demand (BOD), total suspended solids (TSS), a DO, an F/M ratio, a wasting rate, solids retention time (SRT), a mixed liquor suspended solids (MLSS) concentration, a pH, a mixed liquor concentration, a pollutant, an aeration, and/or a flow.

Nitrogen, phosphorus, carbon, oxygen, and food organics are some essential nutrients for growth. The report from correction component 38 may automatically recommend a remedy for any detected deficiency or saturation.

Figure 15:
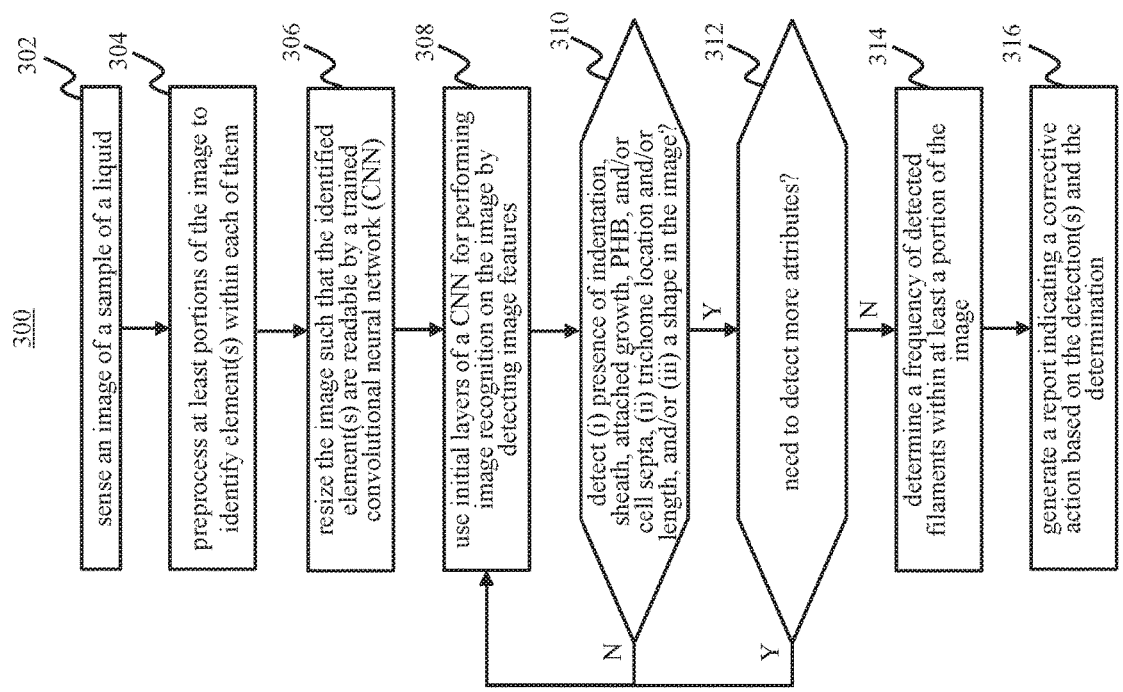
FIG. 15 illustrates a method for detecting and classifying micro-organism samples with neural networks, in accordance with one or more embodiments.

FIG. 15 illustrates method 300 for validating, testing, or using one or more prediction models for predicting a type and number of filamentous bacteria, in accordance with one or more embodiments. Method 300 may be performed with a computer system comprising one or more computer processors and/or other components. The processors are configured by machine readable instructions to execute computer program components. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 15 and described below is not intended to be limiting. In some embodiments, method 300 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of method 300 in response to instructions stored electronically on an electronic storage medium. The processing devices may include one or more devices configured through hardware, firmware, and/or software to be specifically designed for execution of one or more of the operations of method 300.

At operation 302 of method 300, one or more images may be sensed. As an example, the image(s) may or may not depict one or more bacteria. In this or another example, the image(s) may be a magnified representation of a sample on slide 52. Method 300 may be executed using one or more images (e.g., via simultaneous or sequential evaluation). In some embodiments, operation 302 is performed by a processor component the same as or similar to preprocessing component 30 (shown in FIG. 1 and described herein).

At operation 304 of method 300, at least portions of the image may be preprocessed to identify element(s) within each of the portions. As an example, since natural images are sometimes degraded by noise or other distortions, the preprocessing may first remove at least some of the distortion based on any suitable noise removal algorithm. Then, the preprocessing may pull from a library (e.g., OpenCV) such functions as thickness erosion, thickness dilation, opening, closing, morphological gradient, top hat, black hat, and other morphological operations. In operation 304, some embodiments may identify the element(s) by adjusting contrast in and around the one or more elements. The adjusted contrast may be based on analysis of a color, lightness, or shading in and/or around the one or more elements. This operation may be based on an assumption that color or intensity changes sharply on the boundary between different objects. The disclosed deep neural networks may learn hierarchical feature representations in their multiple-layer structure. By adopting CNN, the disclosed edge detection system may be free from extra feature extraction or multiple channel computation, thus being straightforward and efficient. On the other hand, the CNN may capture local patterns from images in its convolutional layers for edge detection. In some embodiments, operation 304 is performed by a processor component the same as or similar to preprocessing component 30 (shown in FIG. 1 and described herein).

At operation 306 of method 300, an image may be resized such that the identified element(s) are readable by or standardized for a trained CNN. As an example, the CNN for performing image recognition on the image may be obtained to identify image features, and the OpenCV library or equivalent may be used at operation 306 to resize one or more portions of the image or to resize the entire image itself. In some embodiments, operation 306 is performed by a processor component the same as or similar to attribute recognition component 34 and/or density recognition component 36 (shown in FIG. 1 and described herein).

At operation 308 of method 300, the initial layers of a CNN (e.g., convolutional layer, activation, pooling) may be used to perform image recognition on the image by identifying image features. As an example, the CNN may be obtained from models 60-2 of FIG. 1. That is, after training component 32 trains the neural networks, the resulting trained models may be stored in models 60-2 storage/database. As an aside, models 60-2 may further contain one or more other neural networks that are trained, obtained, and used. Some implementations of system 10 may obtain a different model for a plurality of different attributes to be detected. Image features of the image may be determined by using the obtained ANN (e.g., the CNN). Image feature values may represent visual features of one or more aspects of the image. A feature may be an interesting part of an image. For example, features or patterns may be one or more of textures, edges, corners, regions, shadings, shapes, ridges, straight lines, T-junctions, Y-junctions, or other characteristics of the image. Some embodiments may only examine the image in the region of the features whereas others may examine all pixels of the image. In some embodiments, operation 308 is performed by a processor component the same as or similar to attribute recognition component 34 and/or density recognition component 36 (shown in FIG. 1 and described herein).

At operation 310 of method 300, at least one attribute present in one or more image portions may be automatically predicted. As an example, attribute recognition component 34 may detect (i) presence of indentation, sheath, attached growth, PHB, and/or cell septa, (ii) trichome location and/or length, and/or (iii) a shape in the image. If one or more such attributes are detected, operation 312 may be executed. If none of these attributes are detected, one or more previous operations (e.g., 308) may be revisited for repeating subsequent detection attempts (e.g., on other image features and/or on other portions of the image).

At operation 312 of method 300, attribute recognition component 34 may determine whether to attempt detection of another attribute. As an example, if a micro-organism type has not yet been confidently determined (i.e., based on a confidence criterion), attribute recognition component 34 may determine that one or more previous operations (e.g., 308) need to be revisited to detect more attribute(s).

At operation 314 of method 300, a frequency of detected micro-organisms relative to a specific image portion may be determined within at least this portion. In some embodiments, operation 314 is performed by a processor component the same as or similar to density recognition component 36 (shown in FIG. 1 and described herein).

At operation 316 of method 300, a report indicating a corrective action may be generated and automatically transmitted based on the predicted detection(s) of operation 310 and the determination of operation 314. In some embodiments, operation 316 is performed by a processor component the same as or similar to correction component 38 (shown in FIG. 1 and described herein).

Techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices (e.g., flash); magnetic disks, such as, internal hard disks or removable disks; magneto-optical disks; and CD-ROM and DVD-ROM disks. The processor and the memory can be supplemented by, or incorporated in special purpose logic circuitry.

Several embodiments of the invention are specifically illustrated and/or described herein. However, it will be appreciated that modifications and variations are contemplated and within the purview of the appended claims.

What is claimed is:

1. A computer-implemented method, the method comprising:
    obtaining, from bulk liquid or surface foam of an activated sludge aerated tank, one sample;
    obtaining one sensed image of the sample via a sensor;
    identifying a plurality of different types of filaments in the image;
    first determining a relative predominance within at least a portion of the image by observing therein a first number of first filaments, having one of the identified types, that is greater than a second number of second filaments of each other identified type, each of the first and second filaments comprising a plurality of cells;
    first detecting, in at least one of the first filaments, presence of one or more of an indentation, sheath, and attached growth;
    second determining whether to perform corrective action, at the activated sludge aerated tank, based on the first determination and the first detection;
    generating a report based on the second determination, wherein the report indicates the corrective action; and
    performing the corrective action;
    wherein the corrective action is at least one of altering dissolved oxygen, altering food to microorganism ration, altering the level of low molecular weight organic acids, altering hydrogen sulfide, altering nitrogen, altering phosphorous, altering sludge age, and altering pH.

2. The method of claim 1, wherein the sensed image is a magnified image.

3. The method of claim 1, further comprising:
    second detecting one or more of location of a trichome, length of the trichome, presence of a cell septa, and presence of polyhydroxybutyrate (PHB),
    wherein the second determination is further based on the second detection.

4. The method of claim 1, wherein the corrective action is based on a probable cause, and
    wherein the probable cause is determined based on a type of indicator organism present in the sample, the presence being determined based on the identification and the first detection.

5. The method of claim 1, wherein the sample consists of a layer interposed between a microscope slide and a covering sheet.

6. The method of claim 1, wherein the sensor is a camera of a mobile device, and
    wherein the report is transmitted to a remote system.

7. The method of claim 1, further comprising:
    providing a microscope, wherein the sensor is operably coupled to the microscope.

8. The method of claim 1, further comprising:
    dynamically determining corrective action in real-time without having to remove the sample from among the activated sludge aerated tank.

9. The method of claim 1, further comprising:
    detecting presence of a secreted elevated polysaccharide.

10. The method of claim 1, further comprising:
    third detecting that a clarity quality of the image does not satisfy a criterion; and
    responsive to the third detection, obtaining another sensed image of the sample with one or more parameters of the sensor being varied.

11. The method of claim 1, further comprising:
    separating contaminated solids based on the corrective action and/or the report.

12. The method of claim 4, wherein the probable cause is selected from among a low dissolved oxygen (DO), low food to microorganism (F/M) ratio, high level of low molecular weight (LMW) organic acids, hydrogen sulfide, nitrogen deficiency, phosphorus deficiency, sludge age, and low pH.

13. The method of claim 1, further comprising:
    fourth detecting presence of one or more indicator organisms, including amoeboid, flagellate, ciliate, rotifer, and/or nematode in the image,
    wherein the second determination is further based on the fourth detection,
    wherein the report indicates the corrective action such that the corrective action is performed.

14. The method of claim 1, wherein the identification and the first detection are performed using deep learning.

15. A system, comprising:
    non-transitory memory; and
    a processor coupled to the memory storing instructions that, when executed, cause the processor to perform:
        obtaining one sensed image of one sample obtained from bulk liquid or surface foam of an activated sludge aerated tank;
        identifying a plurality of different types of filaments in the image;
        first determining a relative predominance within at least a portion of the image by observing therein a first number of first filaments, having one of the identified types, that is greater than a second number of second filaments of each other identified type, each of the first and second filaments comprising a plurality of cells;
        first detecting, in at least one of the first filaments, presence of one or more of an indentation, sheath, and attached growth;

second determining whether to perform corrective action, at the activated sludge aerated tank, based on the first determination and the first detection;

generating a report based on the second determination, wherein the report indicates the corrective action; and transmitting to at least one device or instrument to perform the corrective action;

wherein the corrective action is at least one of altering dissolved oxygen, altering food to microorganism ration, altering the level of low molecular weight organic acids, altering hydrogen sulfide, altering nitrogen, altering phosphorous, altering sludge age, and altering pH.

16. The system of claim 15, wherein the sensed image is a magnified image.

* * * * *